(12) United States Patent
Szalas et al.

(10) Patent No.: US 10,441,130 B2
(45) Date of Patent: Oct. 15, 2019

(54) WASHING AND RINSING AGENTS DISPENSING DEVICE, PARTICULARLY FOR A DISHWASHER MACHINE

(71) Applicant: BITRON POLAND SP. Z O.O., Sosnowiec (PL)

(72) Inventors: Krzysztof Szalas, Branice-Opole (PL); Adrian Ficek, Jaworzno-Slask (PL); Carlo Arbino, Carmagnola (IT)

(73) Assignee: BITRON POLAND SP. Z O.O., Sosnowiec (PL)

( * ) Notice: Subject to any disclaimer, the term of this patent is extended or adjusted under 35 U.S.C. 154(b) by 0 days.

(21) Appl. No.: 15/525,438

(22) PCT Filed: Dec. 7, 2015

(86) PCT No.: PCT/EP2015/078861
§ 371 (c)(1),
(2) Date: May 9, 2017

(87) PCT Pub. No.: WO2016/091822
PCT Pub. Date: Jun. 16, 2016

(65) Prior Publication Data
US 2017/0319044 A1 Nov. 9, 2017

(30) Foreign Application Priority Data
Dec. 12, 2014 (PL) ........................................ 410532

(51) Int. Cl.
*A47L 15/00* (2006.01)
*A47L 15/44* (2006.01)
*F03G 7/06* (2006.01)

(52) U.S. Cl.
CPC ......... *A47L 15/4409* (2013.01); *A47L 15/449* (2013.01); *A47L 15/4418* (2013.01);
(Continued)

(58) Field of Classification Search
CPC .. A47L 15/00; A47L 15/4409; A47L 15/4418; A47L 15/4463; A47L 15/449; F03G 7/065
(Continued)

(56) References Cited

U.S. PATENT DOCUMENTS

2007/0215653 A1\* 9/2007 Marone ............... A47L 15/4409
222/651
2016/0296099 A1 10/2016 Marone et al.

FOREIGN PATENT DOCUMENTS

DE 26 09 875 A1 9/1977
DE 10 2010 003 774 A1 10/2011
(Continued)

OTHER PUBLICATIONS

International Search Report for PCT/EP2015/078861, dated Feb. 23, 2016 (PCT/ISA/210).
(Continued)

*Primary Examiner* — Levon J Shahinian
(74) *Attorney, Agent, or Firm* — Sughrue Mion, PLLC

(57) ABSTRACT

A dispensing device including a support body wherein there are provided first and second dispensers, adjacent one another, for a washing agent and a rinsing agent, respectively; and an electrically-controlled actuator device, coupled to the first dispenser such that when the door is closed a first energization of the actuator device causes the dispensing of the washing agent, and coupled to the second dispenser through a transmission mechanism predisposed to become enabled to operate after a first energization of the actuator device after the door is closed, to allow the dispensing of the rinsing agent as a consequence of at least one subsequent energization of the actuator device. The second dispenser has a main chamber adapted to contain a plurality of doses of rinsing agent and a dosing chamber having a predetermined volume. During displacement obturator
(Continued)

between the rest position and the loading position, the main chamber remains permanently uncoupled from the discharge conduit.

8 Claims, 18 Drawing Sheets

(52) U.S. Cl.
 CPC .......... *A47L 15/4463* (2013.01); *F03G 7/065* (2013.01); *A47L 15/00* (2013.01)
(58) Field of Classification Search
 USPC ................... 134/56 D, 57 D, 58 D, 93, 94.1; 222/651; 337/123, 140
 See application file for complete search history.

(56) References Cited

FOREIGN PATENT DOCUMENTS

| EP | 1 740 082 B1 | 7/2008 |
|---|---|---|
| WO | 2013/092813 A3 | 6/2013 |
| WO | 2015/078913 A1 | 6/2015 |

OTHER PUBLICATIONS

Written Opinion of the International Searching Authority for PCT/EP2015/078861, dated Feb. 23, 2016 (PCT/ISA/237).

\* cited by examiner

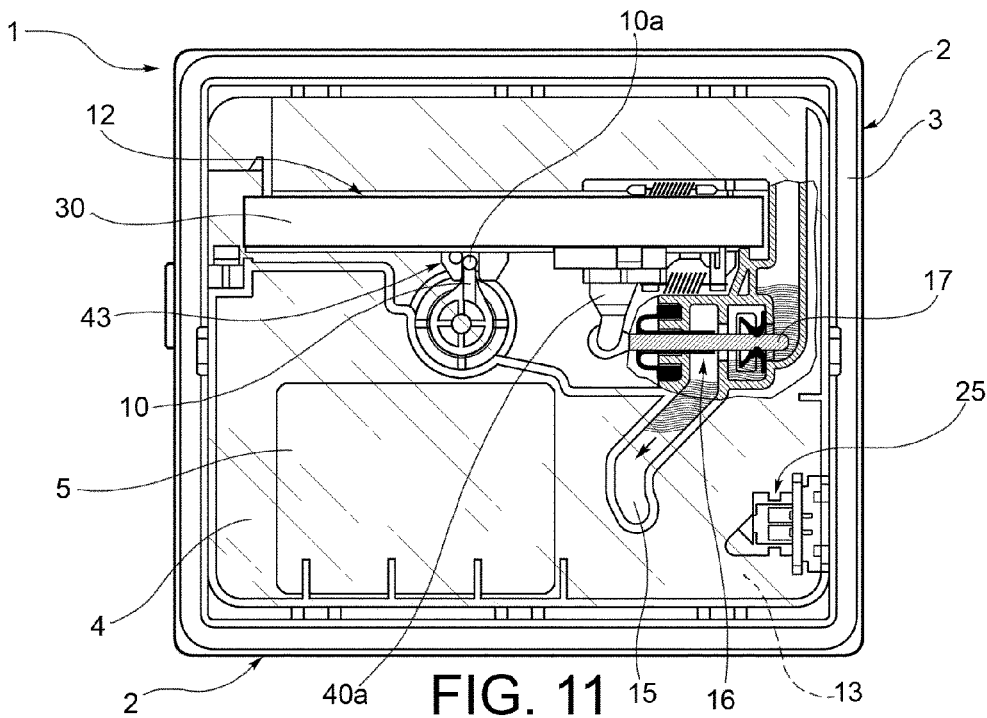
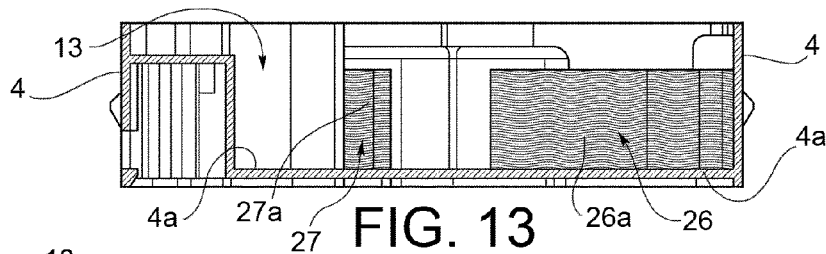
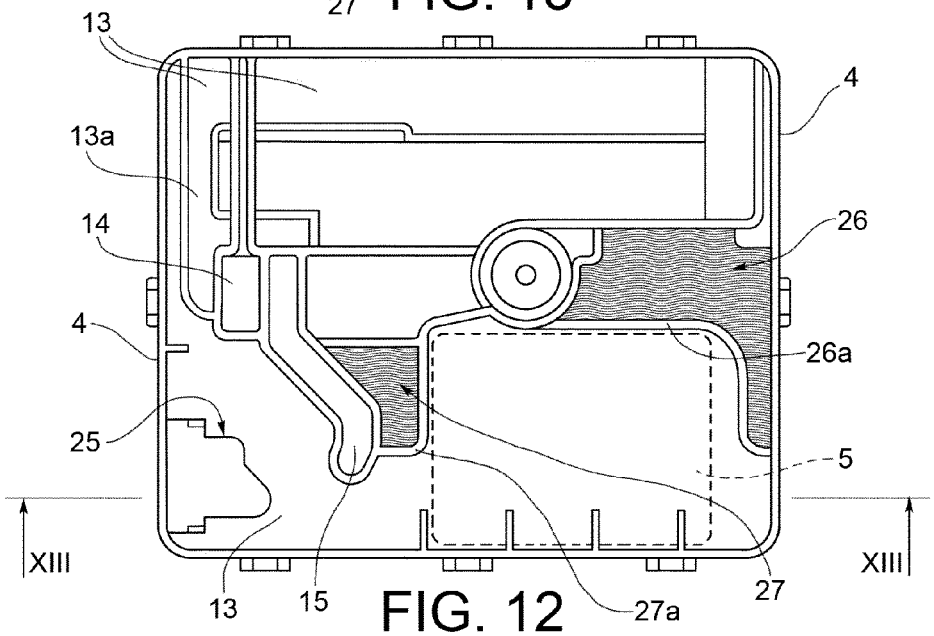

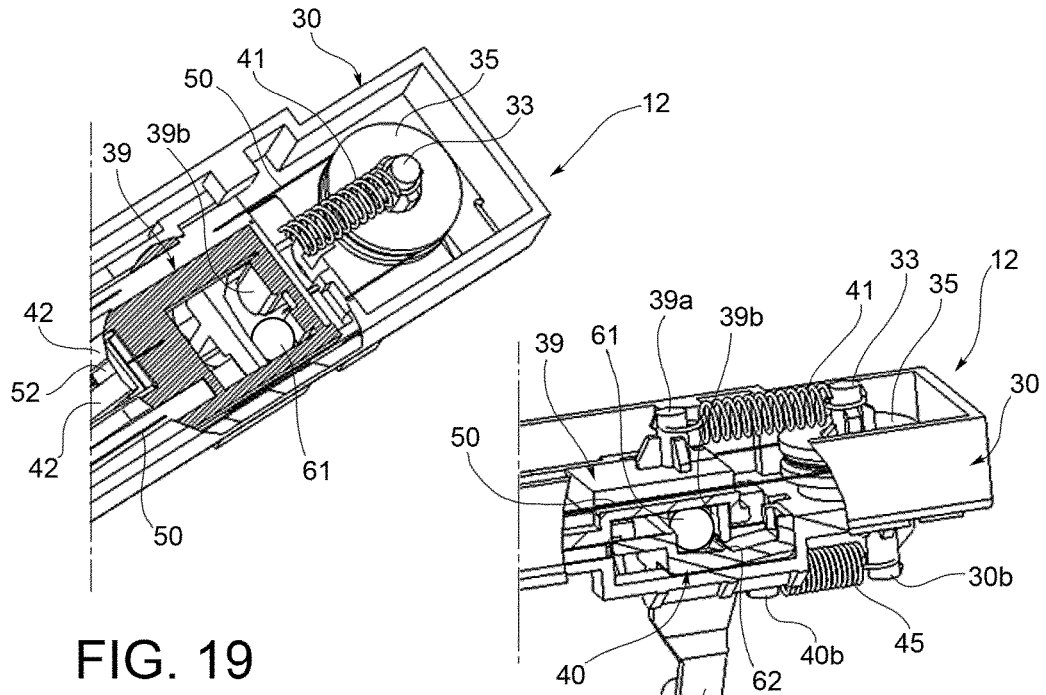
FIG. 19
FIG. 20
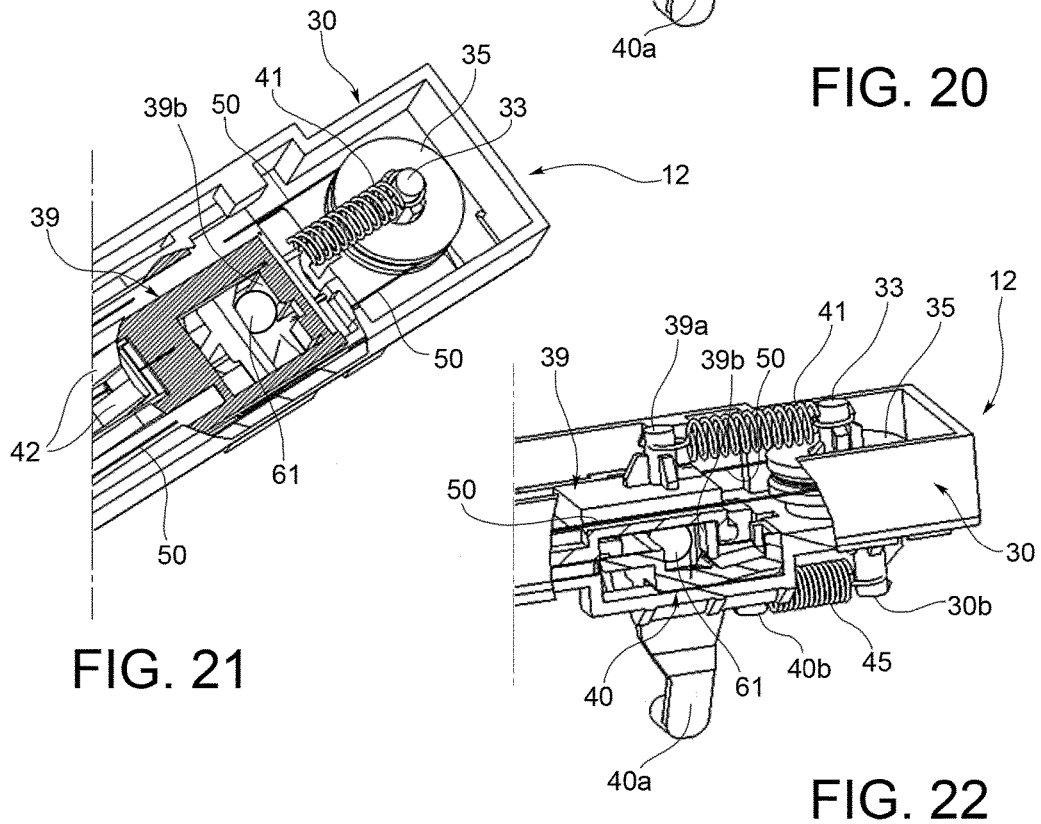
FIG. 21
FIG. 22

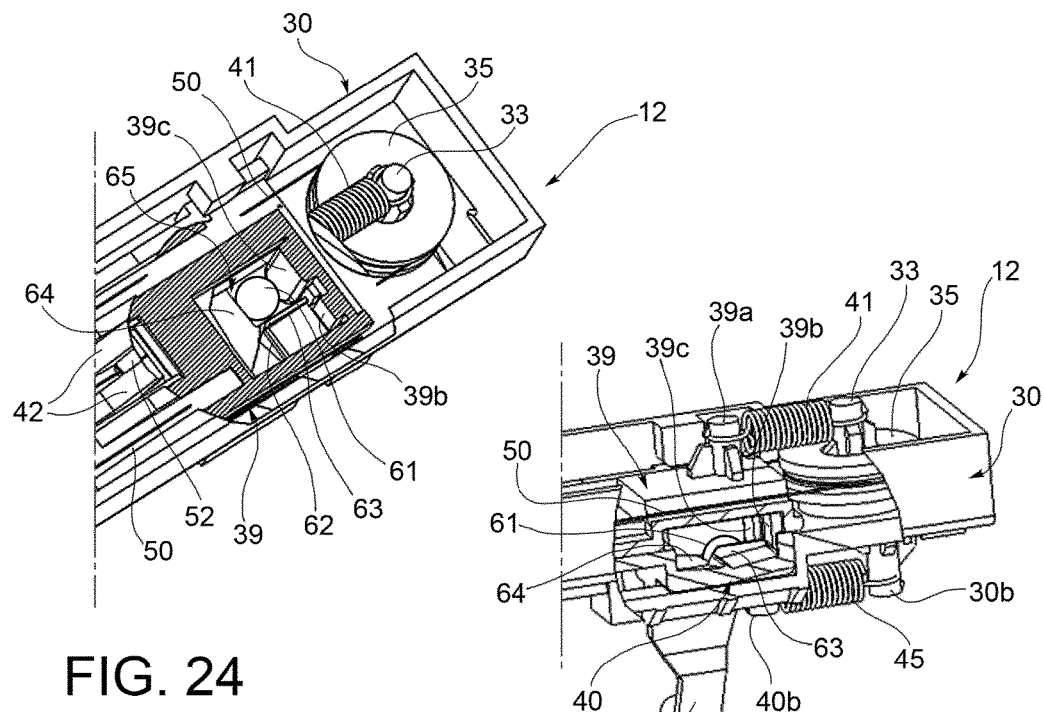
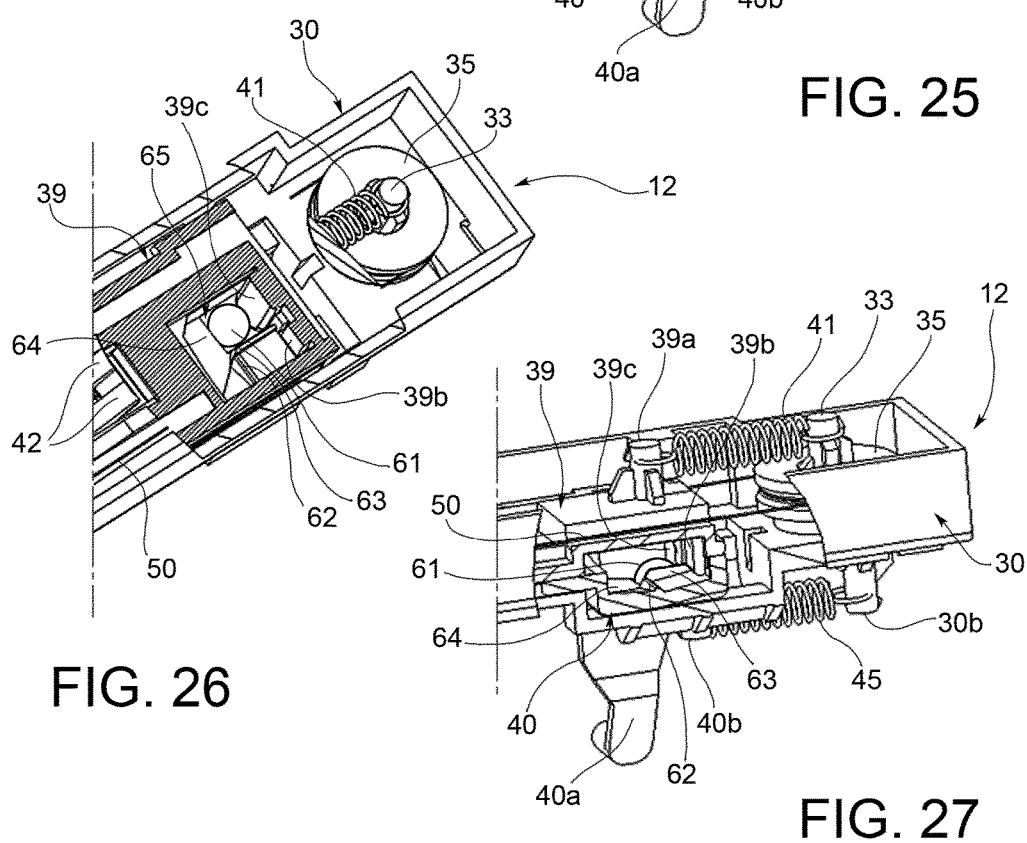

WASHING AND RINSING AGENTS DISPENSING DEVICE, PARTICULARLY FOR A DISHWASHER MACHINE

CROSS REFERENCE TO RELATED APPLICATIONS

This application is a National Stage of International Application No. PCT/EP2015/078861 filed Dec. 7, 2015, claiming priority based on Polish Patent Application No. P.410532, filed Dec. 12, 2014, the contents of all of which are incorporated herein by reference in their entirety.

BACKGROUND OF THE INVENTION

Field of the Invention

The present invention relates to an integrated dispensing device for washing and rinsing agents for a rotatable door of a washing-machine, in particular a dishwasher machine.

Background

More specifically, the invention concerns an integrated dispensing device comprising
- a support body wherein there are provided first and second dispensers, adjacent one another, for a washing agent and a rinsing or brightening agent, respectively; and
- an electrically-controlled actuator device, coupled to the first dispenser such that when the door is closed a first energisation of the actuator device causes the dispensing of the washing agent, and coupled to the second dispenser through a transmission mechanism predisposed to become enabled to operate after a first energisation of the actuator device to allow the dispensing of the rinsing agent caused by at least one successive energisation of the actuator device.

An integrated washing and rinsing agents dispensing device of that kind is known from prior Polish patent application No. P. 406269 in the name of the same Applicant.

Further integrated dispensing devices for washing and rinsing agents are disclosed for instance in EP 1 740 082 A1 and WO 2013/092813 A2.

SUMMARY OF THE INVENTION

An object of the present invention is to provide an improved dispensing device for washing and rinsing agents.

This and other objects are achieved according to the invention by means of a dispensing device of the initially defined kind, wherein the second dispenser comprises
- a main chamber adapted to contain a plurality of doses of rinsing agent,
- a dosing chamber having a predetermined volume, corresponding to that of one dose, and having an inlet opening and an outlet opening intended to be coupled with the main chamber and with a discharge conduit, respectively, and
- a valve device including an obturator mounted movable in the dosing chamber and controlled by said actuator device such that
    when the actuator device is energised after the transmission mechanism has become enabled to operate, the obturator passes from a rest position wherein it decouples the dosing chamber from the main chamber, to a loading position, opening the inlet opening and keeping constantly closed the outlet opening of the dosing chamber, to allow a flow of rinsing agent from the main chamber to the dosing chamber through said inlet opening; and
    when the actuator device is subsequently de-energised, the obturator returns from its loading position to its rest position, opening the outlet opening and keeping the inlet opening of the dosing chamber closed;
- the arrangement being such that during the displacement of said obturator between the rest position and the loading position, the main chamber remains constantly uncoupled from the discharge conduit.

In such an integrated dispensing device, a detecting device can be conveniently associated to one portion of the main chamber of the second dispenser, for providing electric signals indicating the level of the rinsing agent when the door is open. In such an integrated dispensing device according to the invention, in the main chamber there is conveniently provided with at least one auxiliary chamber, adapted for receiving an amount of rinsing agent when, with the door open, in said main chamber an amount of rinsing agent exceeding a predetermined value is supplied. Said at least one auxiliary chamber is intended for releasing toward the main chamber at least part of the rinsing agent it contains when, with the door closed, the level of the rinsing agent in the main chamber falls below a predetermined level. The arrangement is such that when the door is subsequently opened again, the level of the rinsing agent in the main chamber, at said level detecting device, is increased due to the amount of rinsing agent released from said at least one auxiliary chamber. This solution allows to reduce the frequency with which the main chamber is re-filled.

According to a further feature, in an integrated dispensing device according to the present invention the actuator device comprises
- a stationary structure,
- a main slider, coupled with the first dispenser and movable relative to said structure along a predetermined direction between a rest position and a working position, and
- a wire made of a shape-memory material, having its ends connected to said structure and said main slider, respectively, and coupled with said main slider such that when said wire is energised through an electric current, it shortens and causes a displacement of said slider from its rest position toward its working position, against the action of resilient contrast means, and when de-energised said wire re-elongates allowing a displacement of said main slider toward its rest position.

In a presently preferred embodiment said transmission mechanism comprises a second or further slider, connected to the valve obturator of the second dispenser and translatable relative to the support structure along said predetermined direction, from a rest position toward a working position, against the action of associated resilient contrast means. Said further slider is conveniently adapted to be coupled with the main slider through a spherical member, interposed therebetween such that
    when the door of the machine is closed, the spherical member assumes and is retained in a first position, wherein the auxiliary slider is uncoupled from the main slider,
    when the shape-memory wire is energised for the first time in an operation cycle of the machine, the main slider translates toward its working position to activate the first dispenser, and displaces the spherical member to a second position wherein the auxiliary slider is still uncoupled from the main slider;

when said wire is subsequently de-energised, the main slider translates toward its rest position, and the spherical member moves under gravity toward a third position wherein it engages in a seat defined between said sliders, rendering said sliders solid with one another for translation; and when said wire is energised again, the main slider translates again toward its working position dragging the auxiliary slider toward its own working position for activating the second dispenser;

the spherical member remaining in said seat until the door of the machine is opened again.

BRIEF DESCRIPTION OF THE DRAWINGS

Further features and advantages of the invention will become apparent from the detailed description which follows, by way of a non-limiting example, with reference to the attached drawings, wherein:

FIGS. 9, 10 and 11 are similar to FIGS. 5 and 6 and show further conditions of operation of the integrated dispensing device;

FIG. 12 is a sectional view according to line XII-XII of FIG. 7;

FIG. 13 is a partial sectional view according to line XIII-XIII of FIG. 12;

FIGS. 19 and 20 are partial perspective views similar to those of FIGS. 16 and 17 and show another condition of operation of the actuator device;

FIGS. 21 and 22 are partial perspective views similar to those of FIGS. 19 and 20 and show another condition of operation of the actuator device;

FIGS. 24 and 25 are partial perspective views of the actuator device, shown in a still further condition of operation;

FIGS. 26 and 27 are partial perspective views of the actuator device, shown in another condition of operation;

DETAILED DESCRIPTION OF THE INVENTION

Figure 1:
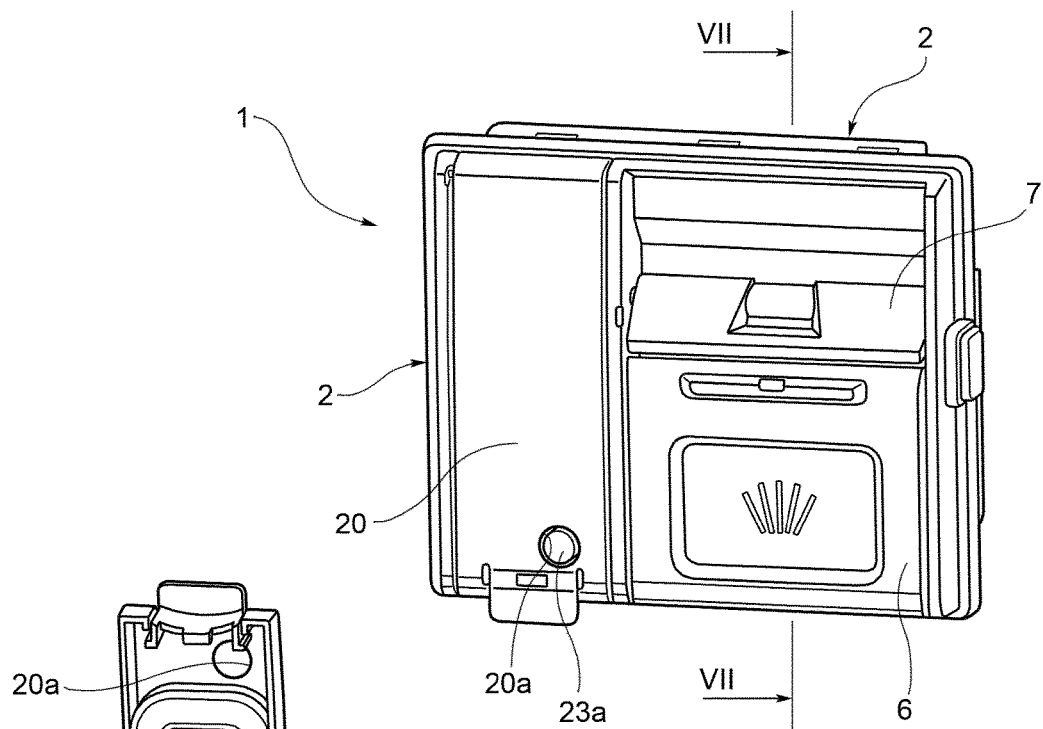
FIGS. 1 and 2 are front perspective views, almost frontal, of an integrated dispensing device according to the present invention, shown with the covers of the first and second dispensers both closed and both opened, respectively.

In the drawings an integrated dispensing device according to the present invention is generally indicated 1.

Such a device is to be fixed on the internal side of the front door of a dishwasher machine.

The door of a dishwasher machine is generally hinged, along its lower side, to the machine body, and can be disposed in an open position, in an essentially horizontal condition (loading position) to allow the arrangement in the washing chamber of the dishes to be washed, or the removal of clean dishes therefrom after a washing cycle.

In the closed condition the machine door is essentially vertical (working position) and closes the washing chamber of the machine in a liquid-tight manner.

The integrated dispensing device 1 mounted in the door of a dishwasher machine is therefore also displaced, in use, between a horizontal loading position, in which it can be loaded with a washing agent and a rinsing or brightening agent, and a working position wherein said device faces the washes chamber and can be activated for dispensing the washing agent and one or more doses of rinsing agent during a washing cycle of the machine.

In the present description, and the following claims, with the term washing agent or detergent is meant any kind of detergent or soap adapted for use in a washing cycle of dishes. Such a detergent may be solid, liquid, or in powder form. By rinsing or brightening agent is meant any product adapted for improving the brightness of the washed articles.

The integrated dispensing device 1 comprises a body 2, for instance of plastic material, intended for mounting in a corresponding aperture predisposed in the door of a dishwasher machine.

The body 2 can be manufactured in two pieces, for instance with a front main portion 3 and an auxiliary rear portion 4, both made by injection moulding, and subsequently coupled and thermally welded to one another, using for instance a hot blade device (see in particular FIGS. 4 and 7, 8). The rear portion can be of an at least partially transparent material.

Figure 2:
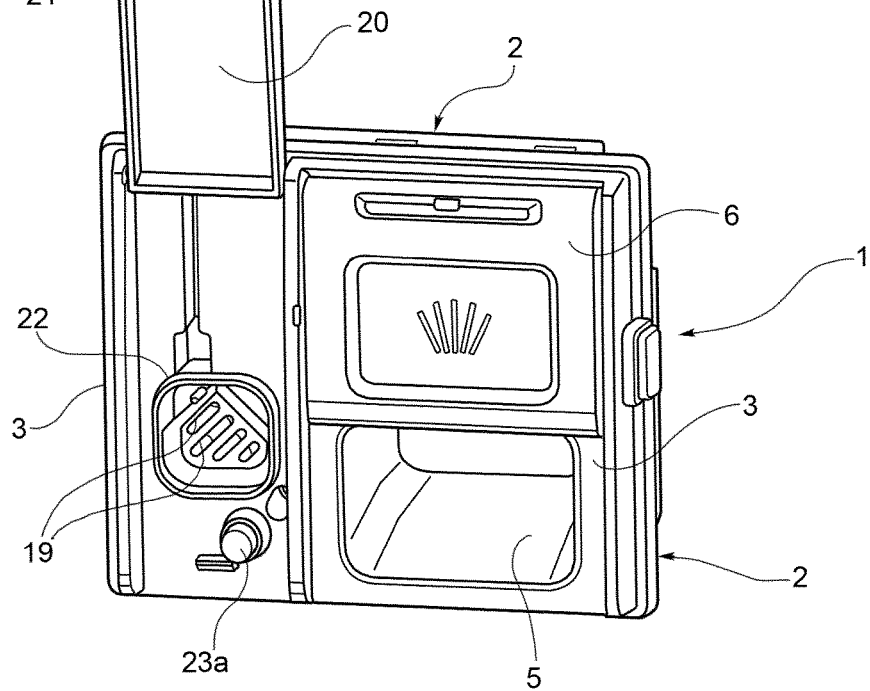
Figure 7:
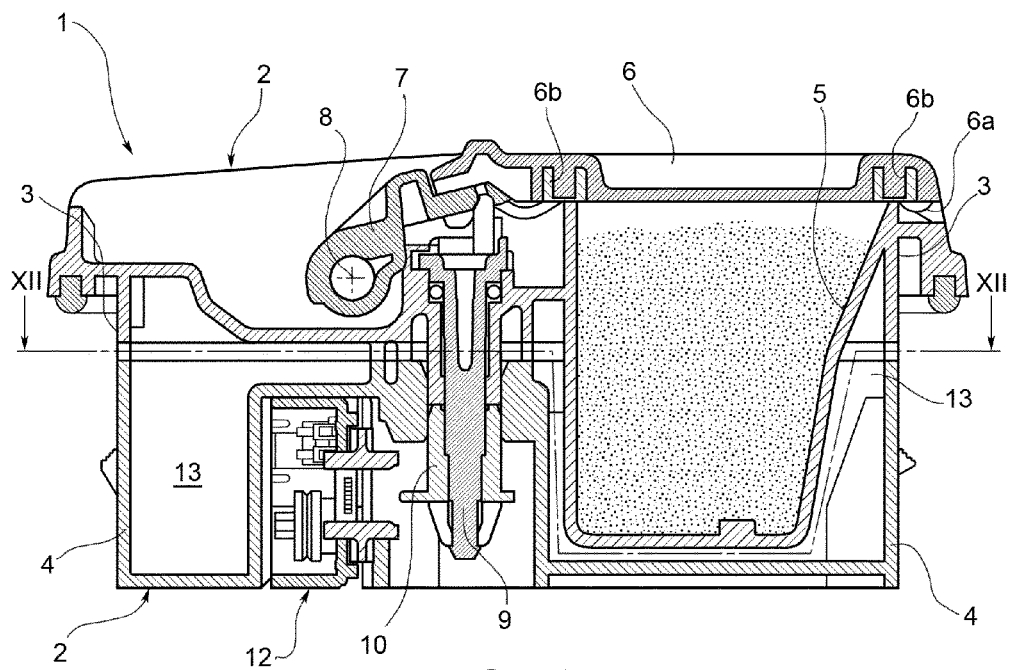
FIG. 7 is a sectional view according to line VII-VII of FIG. 1 and shows the dispensing device in a condition wherein the cover of a washing agent dispenser is closed.
Figure 8:
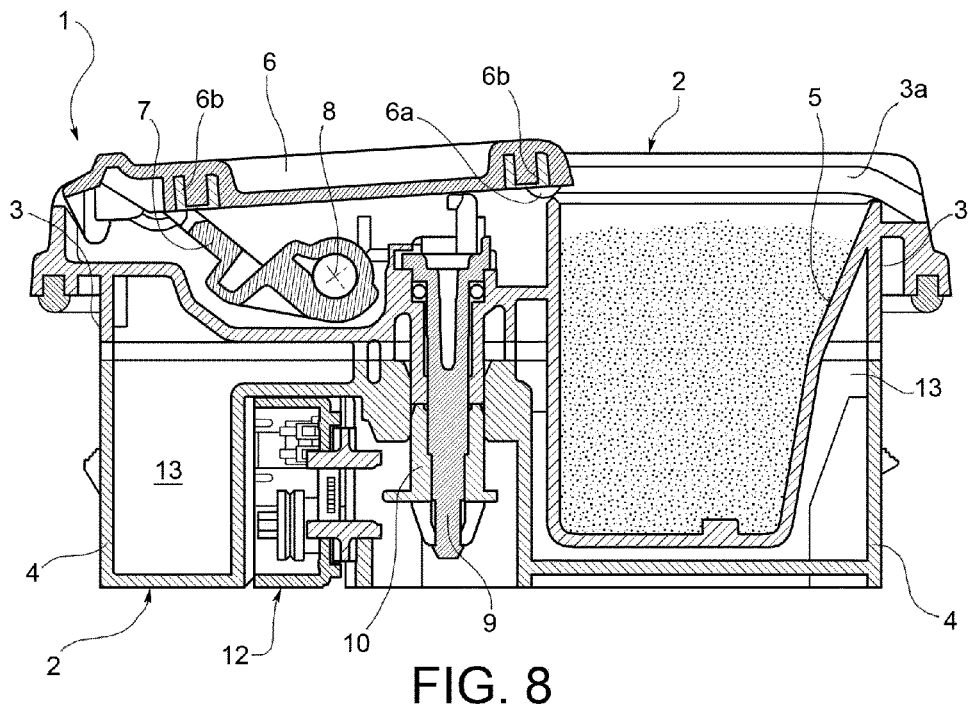
FIG. 8 is a sectional view similar to that of FIG. 7, and shows a condition wherein the cover of the washing agent dispenser is open.

With references to FIGS. 2, 7 and 8, reference 5 indicates a tub-like receptacle intended to contain an amount of washing agent or detergent, formed in the front portion 3 of the body 2 which in use faces the washing chamber of the dishwasher machine.

The receptacle 5 has an associated cover 6, movable in a per se known manner from a closing position shown in FIG. 7, to an opening position shown in FIGS. 2 and 8.

Figure 4:
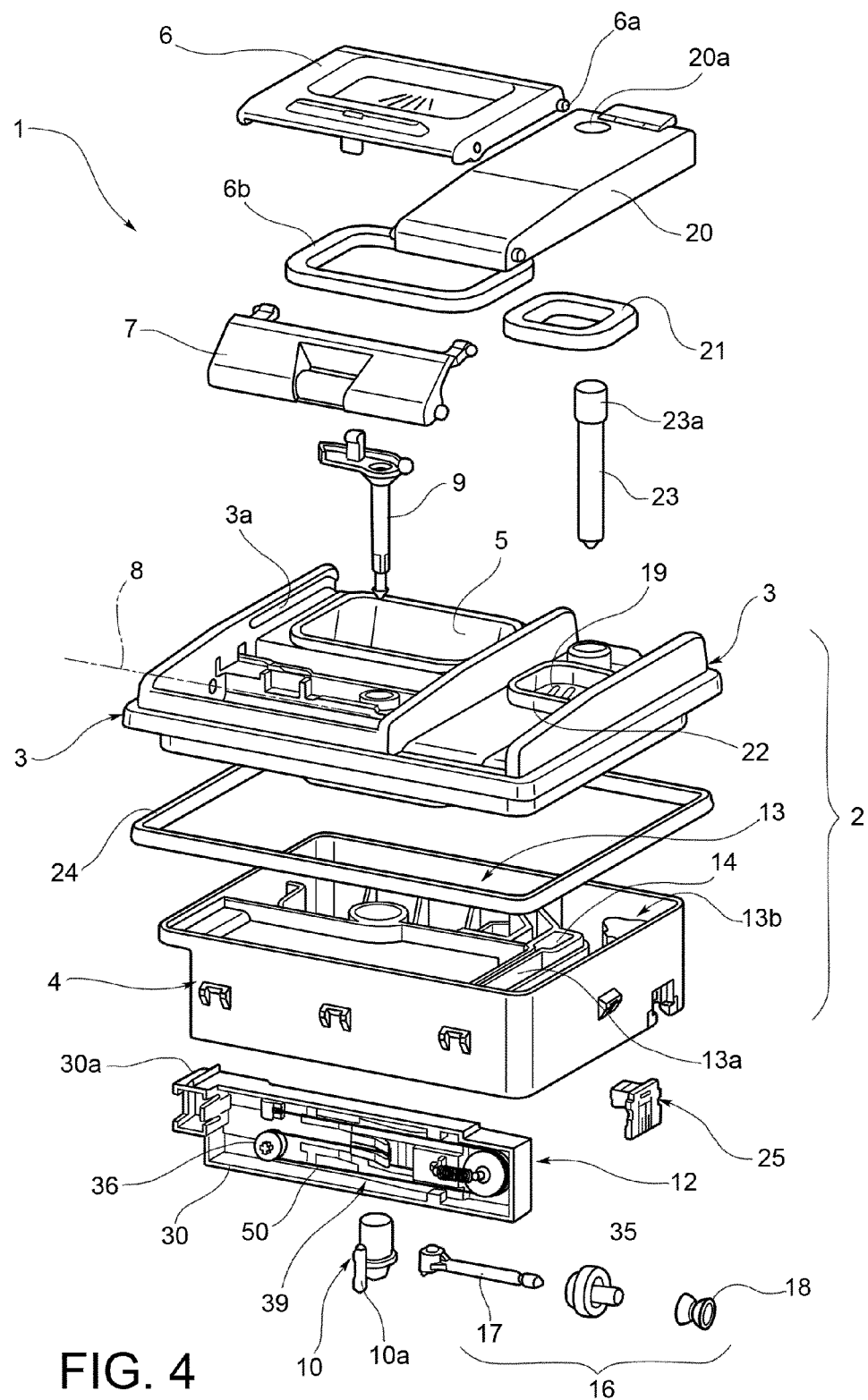
FIG. 4 is a partially exploded perspective view of the integrated dispensing device according to the preceding figures.
Figure 6:
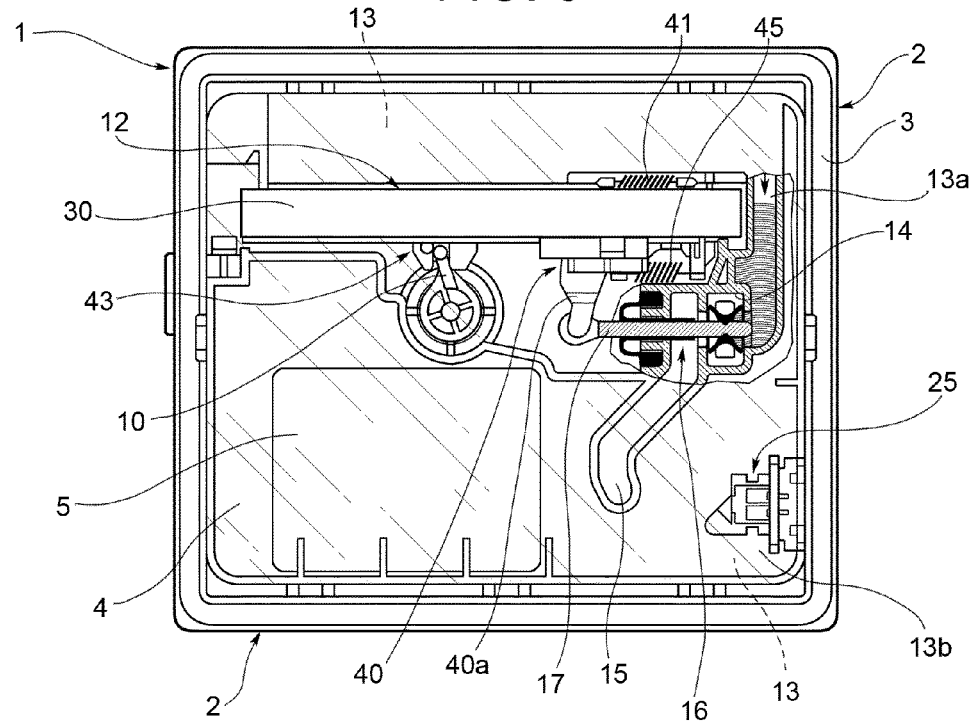

In the exemplary embodiment illustrated in the drawings the cover 6 has, at one end, two opposite pins 6a, only one of them being visible in FIG. 4. Said pins are mounted slidable in respective grooves 3a predisposed in the front portion 3 of the body 2 (FIGS. 4 and 8).

To the lower side or face of the cover 6 there is connected an annular seal 6b, intended to be coupled with the edge of the mouth of the receptacle 5 (FIGS. 4, 7 and 8).

The cover 6 is connected in an articulated manner to a member 7, which is pivotable like a crank about a fixed axis indicated 8 in FIGS. 7 and 8.

A resilient means, and in particular a spring 41 which will be further described in the following, acts, through a transmission mechanism, onto the crank member 7 tending to keep it in the position shown in FIG. 8 in which the cover 6 is open so that the latter uncovers and frees the receptacle 5 of the detergent.

Figure 9:
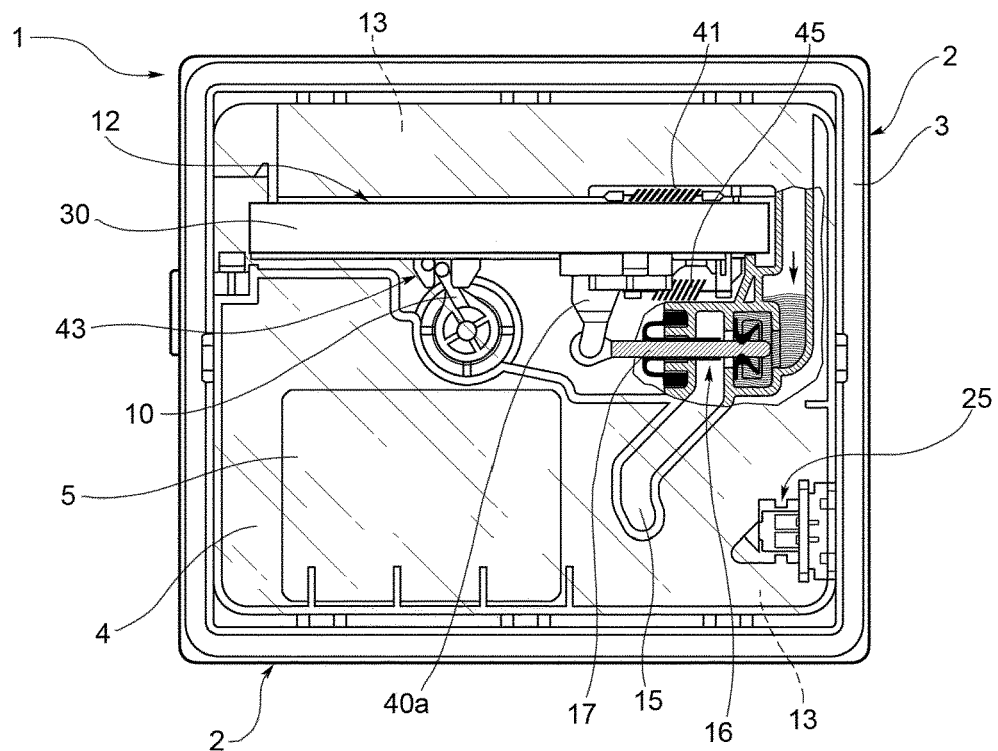
Figure 10:
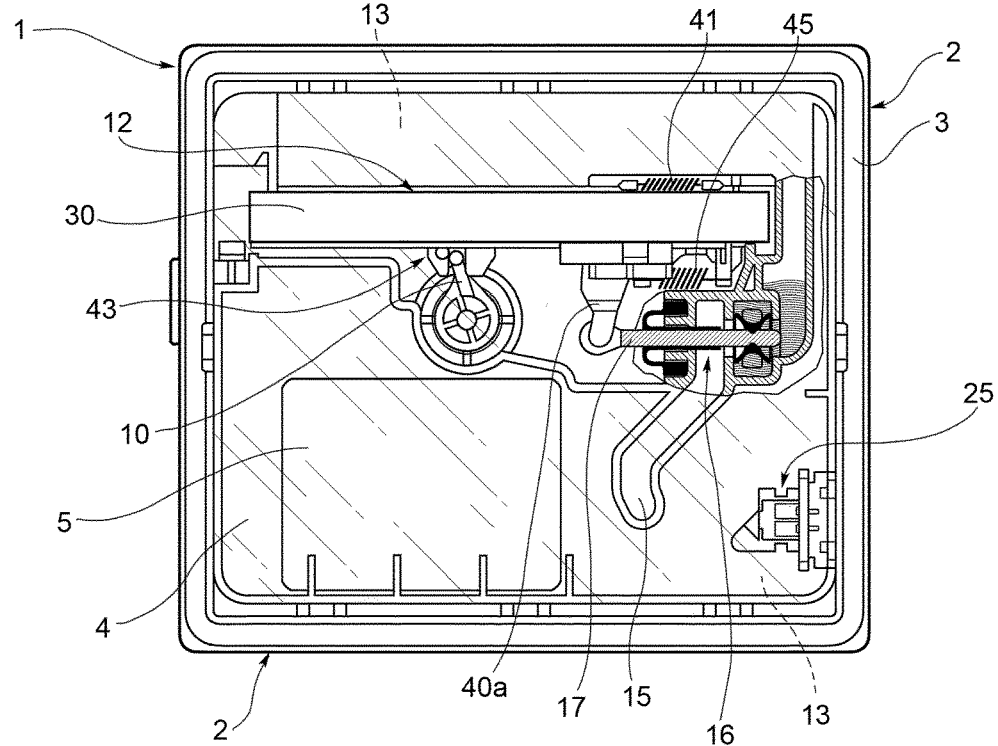

When the cover 6 is in the closed position (FIG. 7), the crank member 7 is kept in the angular position shown in FIG. 7 by a hooking member 9, which is solid with a lever member 10 mounted rotatable within the body 2 (FIGS. 4, 7 and 9).

As it will be clearer in the following, in the operation the lever member 10 is driven in rotation by an actuator device generally indicated 12, to cause the crank member 7 to be freed from the hooking member 9 and the consequent passage of the cover 6 from the closed position to the open position.

The various particulars and components 5-10 described above form, all together, a first dispenser intended to dispense, in the operation, the detergent previously introduced into the receptacle 5, toward the washing chamber of the dishwasher machine.

The integrated dispensing device 1 comprises further a second dispenser, for dispensing toward the washing chamber predefined amounts or doses of a rinsing or brightening agent.

In the illustrated embodiment said second dispenser comprises a main chamber 13, defined inside the rear portion 4 of the body 2 (see in particular FIG. 4), and intended to contain an amount of rinsing agent corresponding to a plurality of doses, to be dispensed in the course of a multiplicity of successive washing cycles.

Said second dispenser comprises further a dosing chamber 14 (see for instance FIGS. 5, 5A, 6 and 6A) having an inlet opening 14a and an outlet opening 14b, to be respectively coupled with a portion 13a of the main chamber 13, and with a discharge conduit 15 which communicates, in use, with the washing chamber of the dishwasher machine.

The washing chamber 14 has an associated valve device generally indicated 16. Said valve device comprises a rod 17, on one end of which there is mounted a double obturator 18.

The opposite end of rod 17 is coupled with an appendix or arm 40a of a slider 40 coupled (in the manner which will be more clearly described in the following) to the actuator device 12.

With reference to FIG. 4, chambers 13 and 14 are closed on top by the body 2 in which, adjacent the mouth of the receptacle 5 for the detergent, there is provided a series of openings 19 (see also FIG. 2) through which the chamber 13 can be filled from time to time with an amount of rinsing agent.

A further cover (FIGS. 1, 2 and 4) is articulated to the front part 3 of the body 2, and is provided with a seal 21 intended to engage in a fluid-tight manner an annular protruding edge 22, formed in the portion 3 of the body 2, around the openings 19 for the introduction of the rinsing or brightening agent.

In FIGS. 2 and 4, reference 23 indicates a rod made of an at least partially transparent material, which extends inside the chamber 13, and whose upper end 23a is retained in the front portion 3 of the body 2, close to the openings 19. When the door of the dishwasher machine is open, the end 23a of rod 23 provides a visual indication of the level of rinsing or brightening agent in the chamber 13.

As it can be seen in particular in FIGS. 1 and 2, the cover 20 associated with the dispenser of rinsing or brightening agent is provided with an opening 20a through which the end 23a of the signalling rod 23 is visible even when said cover 20 is closed.

In FIG. 4 reference 24 indicates a rectangular seal intended to be pinched between a peripheral flange 3a of the front part 3 of the body 2 and a corresponding inner surface of the door of the dishwasher machine.

With reference to FIGS. 3 to 6, a portion 13b of the main chamber 13 has an associated detecting device 25, of a per se known kind, capable of providing electric signals indicating the level of the rinsing agent in said chamber, when the door is open. The detecting device is for instance of an optical type, and can comprise a light emitter and an associated light detector, coupled by means of a transparent prism, in a per se known arrangement.

The level detecting device 25 is intended to provide an electric warning signal in particular when the level of the rinsing agent in the main chamber 13, while the door is open, is at a minimum height, to draw the attention of the user to the fact that it is time to supply rinsing agent again to said chamber.

Since a level detecting device is not in a condition to detect the level of a liquid below a minimum predetermined height, as a matter of fact such a device provides the warning signal when the amount of the rinsing agent which is still present in the main chamber 13 is still sufficient for a plurality of washing cycles, so that the re-loading of the washing agent in the corresponding dispenser is not really so urgent. This results in an unduly high frequency of the re-filling operations.

To remedy to this inconvenience of the dispensers according to the prior art, in the main chamber 13 there is provided at least one, and preferably a plurality of auxiliary chambers, such as those indicated 26 and 27 in FIGS. 12 and 13. As it can be seen in said figures, the chambers 26 and 27 are laterally closed by respective walls 26a and 27a extending from the bottom wall 4a of the rear part 4 of the body 2, however up to a height lower than that of the walls which delimit laterally the washing chamber 13.

As a consequence, the auxiliary chambers 26 and 27 are adapted to receive an amount of rinsing agent when, while the door is open, in the main chamber 13 there is supplied an amount of rinsing agent such as to overcome the upper edges of walls 26a and 27a/FIG. 13).

Subsequently, when the door is closed, as soon as the level of the rinsing agent in the main chamber 13 falls below a predetermined level, at least part of the rinsing agent contained in the auxiliary chambers 26 and 27 falls into the main chamber 13. As a consequence thereof, at the subsequent opening of the door of the machine the level of the rinsing agent in the main chamber 13, and in particular at the level detector 25, is increased because of the amount of rinsing agent supplied to the main chamber from the auxiliary chambers 26 and 27.

The auxiliary chambers 26 and 27 thus allow to "delay" the generation of the warning signal indicating the need to attend to re-filling the rinsing agent dispenser.

Reverting now again to FIGS. 5A and 6A, the obturator 18 in the illustrated embodiment is in the form of a seal, for instance of an elastomer material, and is provided with two annular, flexible, sealing lips 18a, 18b, having an essentially frusto-conical shape, axially spaced with respect to one another. The lip 18a is intended for cooperating in the operation with the inlet opening 14a of the dosing chamber 14, whereas the lip 18b is intended for cooperating with the outlet opening 14b.

The shape, and in particular the axial extension of the obturator 18 is such that, as it will become more readily apparent in the following, the portion 13a of the main chamber 13 is never in direct communication with the discharge conduit 15, irrespective of the position assumed by the obturator 18 in the operation. This allows to prevent that, during the displacements of the obturator 18, an even quite small amount of rinsing agent may reach the discharge conduit, but for in the dispensing phase.

Figure 14:
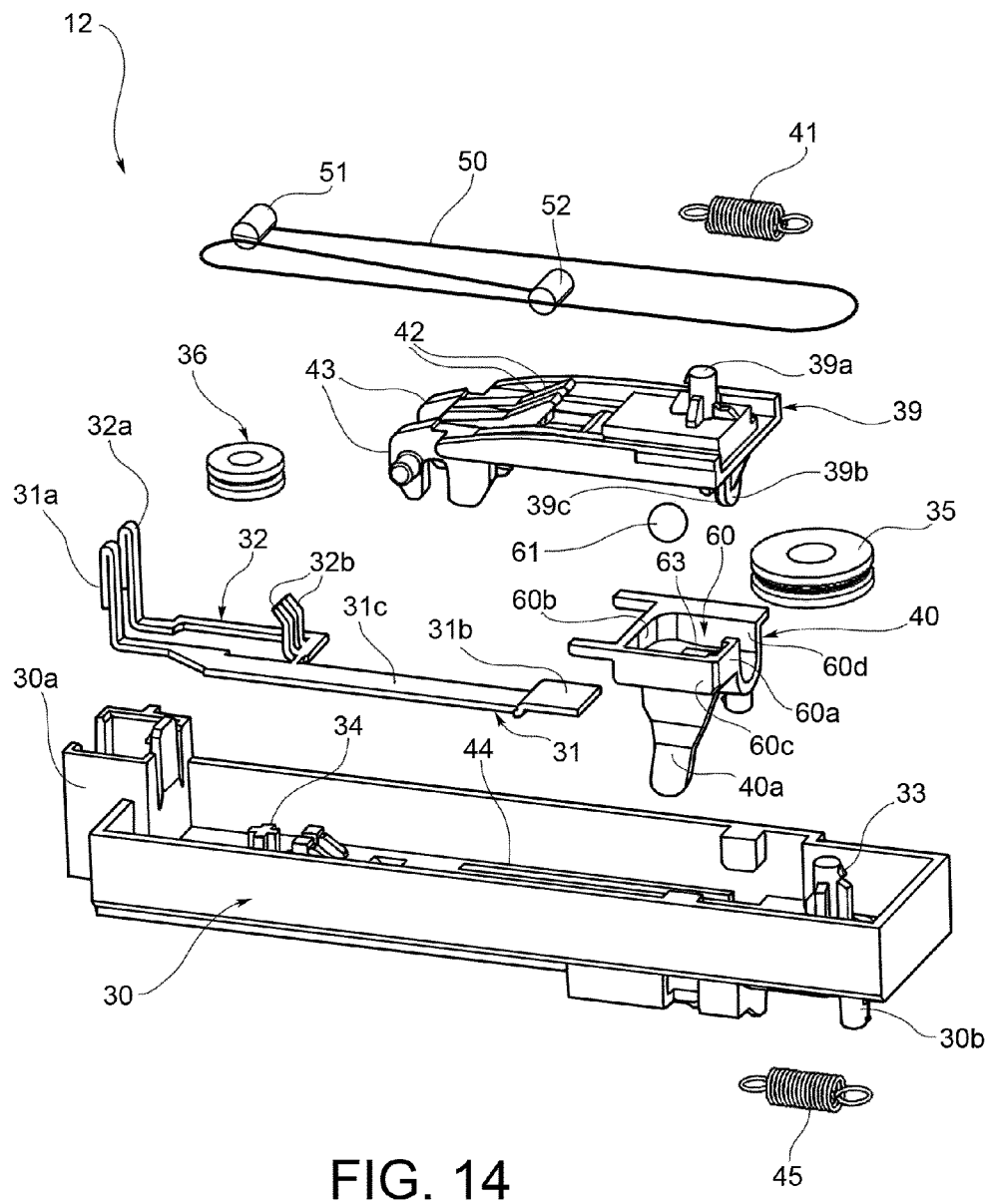
FIG. 14 is a partially exploded perspective view of an actuator device comprised in an integrated dispensing device according to the preceding figures.

With reference to FIG. 14 and the following, in the illustrated embodiment the actuator 18 comprises a support housing 30, stationary in the operation, having essentially the shape of a parallelepiped box, made for instance of a moulded plastic material.

At one end of the support housing 30 there is integrally provided a shell formation forming the insulating body of an electric connector, within which extend first ends 31a, 32a of two members 31 and 32 of an electrically conductive material, manufactured for instance by punching and bending (see in particular FIG. 14).

The electrically conducting member 32 has an intermediate portion extending close to the bottom wall of the support envelope 30, and an end portion 32b extending upwardly and slightly bent, to provide a hooking formation.

The electrically conducting member 31 has an intermediate portion 31c, which has a long longitudinal extension, and which ends forming an end appendix 31b which is slightly raised. As it can be seen for instance in FIG. 18, on the intermediate portion 31c of the member 31 there is conveniently provide a layer or wall 83 of electrically insulating material, preferably the same plastic material with which the housing 30 is made. Said layer or wall 83 can be made in one piece with the housing 30 when the latter is being moulded. The end portion 31b of the member 31 is instead uncovered.

With reference to FIG. 14, from the bottom wall of the housing 30 first and second projections 33 and 34 protrude upwardly, and around them there are pivotably mounted respective deviation pulleys or rollers 35 and 36.

A main slider 39 is mounted translatable within the support housing 3, along the longitudinal direction of the latter.

Figure 17:
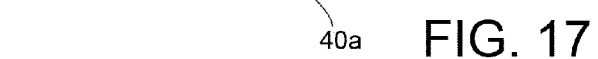

As it can be appreciated by looking at FIGS. 17, 20 and 22, the main slider 39 extends at least in part above the further slider 40.

The slider 39 has an upper projection 39a to which there is anchored a first end of a helical spring 41, the other end of which is anchored to the distal end of the projection 33 of the support housing 30 (see for instance FIG. 17).

Figure 15:
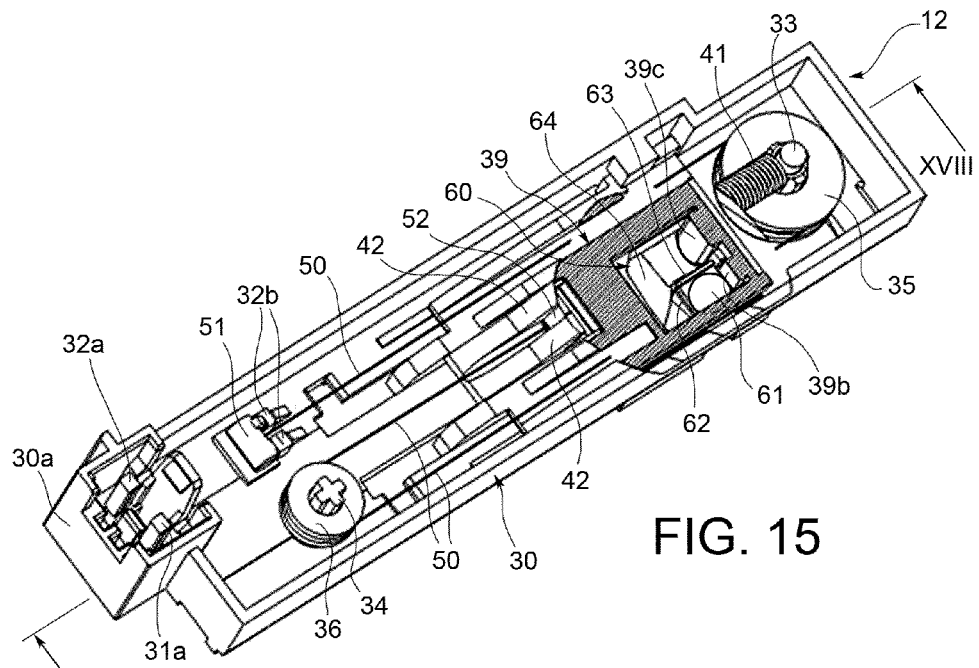
FIG. 15 is a partially sectional, perspective view of the actuator device according to FIG. 14.

Close to the end opposite the projection 39a, the slider 39 has a pair of protruding retaining appendixes 42, transversely aligned and spaced with respect to each other (FIGS. 14 and 15).

With reference to FIG. 14, the slider 39 in its lower portion has a pair of fork-like formations 43, protruding downwardly, which extend through and beyond corresponding slots 44 predisposed in the bottom wall of the support housing 30.

The slider 40, as it has already been stated previously, in its lower portion forms an arm 40a, protruding downwardly, extending through and beyond a corresponding longitudinal slot, equally predisposed in the bottom wall of the support housing 30.

Figure 3:
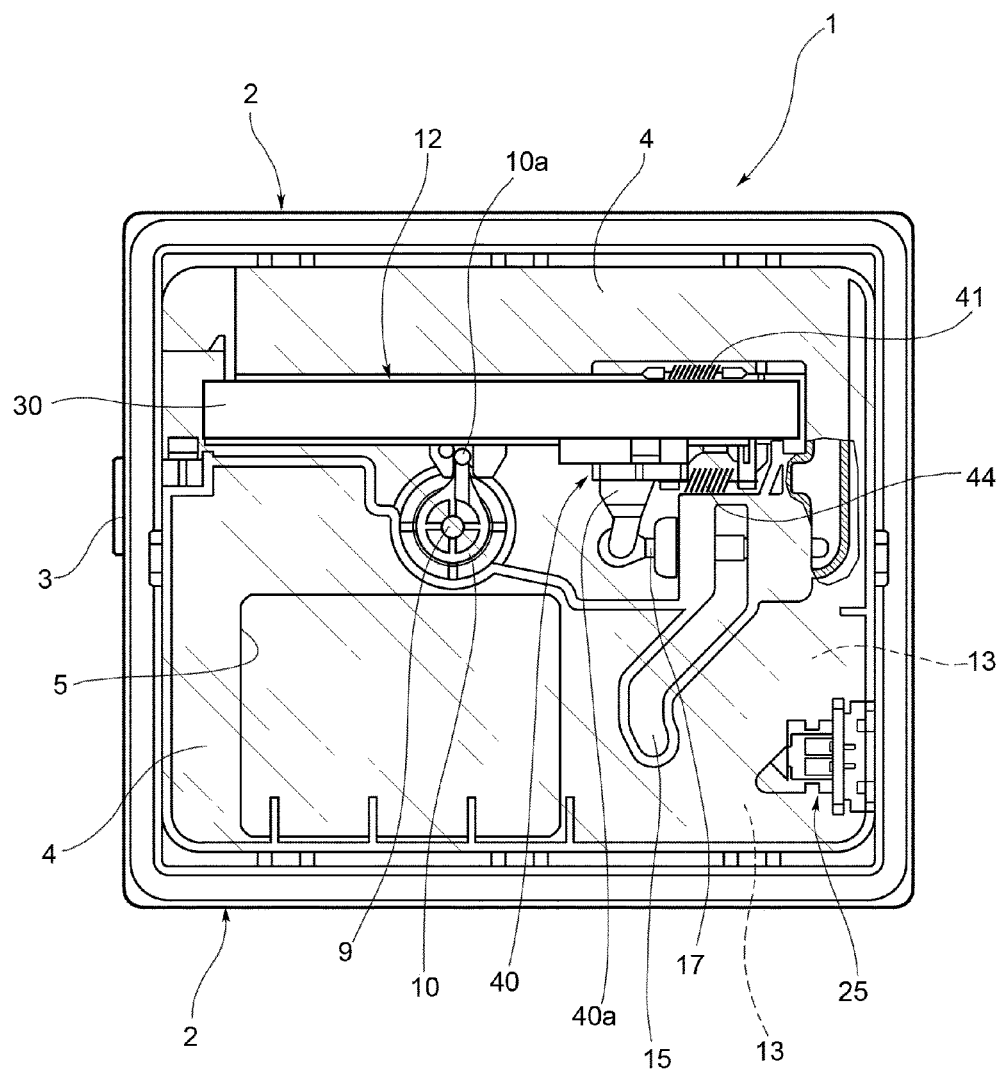
FIG. 3 is a rear view of the integrated dispensing device according the preceding figures.

As it can be seen for instance in FIG. 3, the fork-like appendixes 43 of the slider 39 as well as the arm 40a of the slider 40 protrude outside the support housing 30: the forks 43 engage an appendix 10a of the lever member 10, whereas the distal end of the arm 40a is coupled with one end of the rod 17 of the valve device 16.

Figure 18:
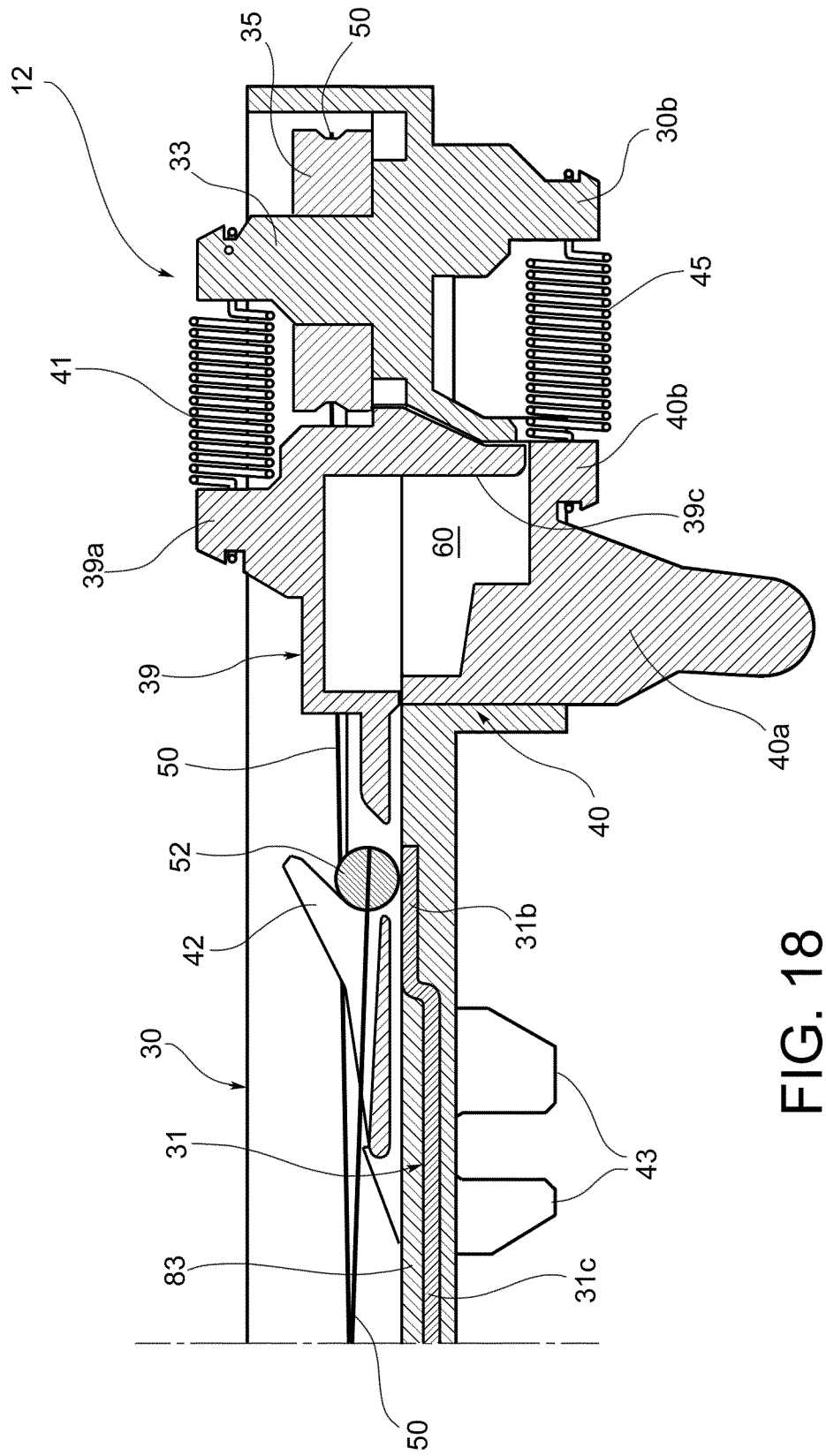
FIG. 18 is a partial sectional view according to line XVIII-XVIII of FIG. 15.
Figure 23:
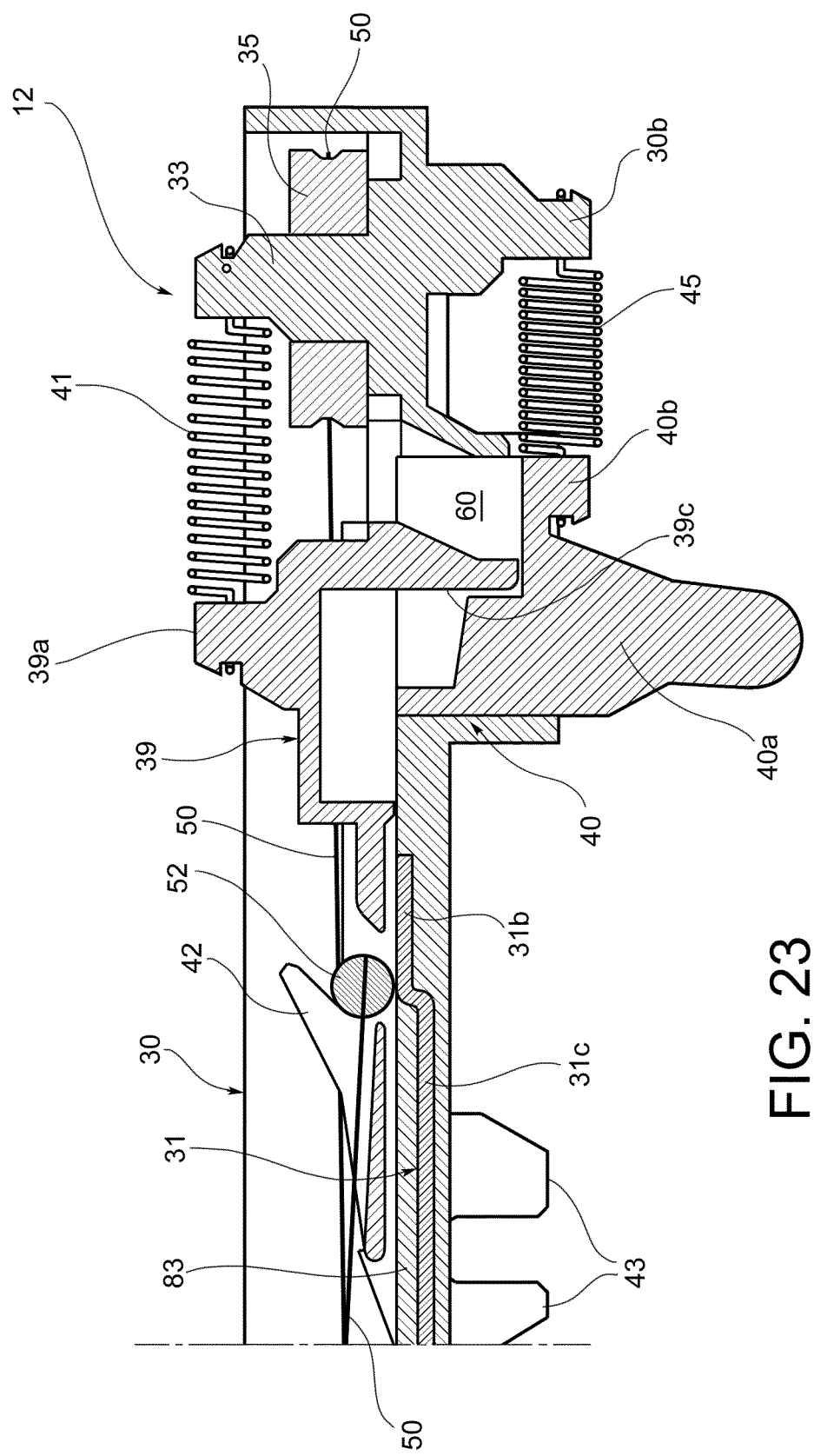
FIG. 23 is a view similar to that of FIG. 18 and shows the actuator device in a longitudinal cross-section, in the condition of operation of FIGS. 21 and 22.

With reference for instance to FIGS. 3 and 18, the arrangement is such that a translation of the main slider 39, toward the left for the observer of said figures, causes a rotation of the lever transmission 10 in a counter-clockwise sense; a translation of the slider 40, still toward the left for the observer of said figures, is instead capable of causing a corresponding translation of the rod 17 of the valve device 16.

With reference for instance to FIGS. 14 and 18, the slider 40 at its lower portion has a projection 40b, onto which there is anchored a first end of a helical contrast spring 45, the other end of which is anchored to a projection 30b protruding downwardly from the lower face of the bottom wall of the support housing 30.

In FIG. 14 and the following, reference 50 indicates the flexible wire made of a shape-memory material, for instance a material based on a titanium alloy. Said wire 50 has its ends firmly connected to two terminals 51 and 52 of metal material, having preferably an essentially cylindrical shape.

As it can be seen for instance in FIG. 15, the terminal 51 of the shape-memory wire 50 is anchored to appendixes 32b of the electrically conducting member 32, whereas the other terminal 52 is anchored to the appendixes 42 of the main slider 39.

Starting from the terminal 51, the shape-memory wire 50 includes a first portion which extends longitudinally in the support housing 30, between said terminal 51 and the deviation pulley 35. After extending around said pulley by approximately 180°, the shape-memory wire 50 forms a second longitudinal portion, which extends from the pulley 35 to the pulley 36.

The wire 50 is deviated again by about 180° around the deviation pulley 36, and has a final longitudinal portion between said pulley 36 and the terminal 52.

The arrangement is such that when no electric current is flowing through the shape-memory wire, the contrast spring 41 tends to keep the main slider 39 in the working position shown in FIGS. 15 to 18, wherein the fork appendixes 43 of said slider 39 maintain the lever transmission member 10 and the associated hooking member 9 in the angular position in which the latter retains the cover 6 in the position in which it closes the receptacle 5 for the detergent.

The arrangement is also such that at the first energisation of the shape-memory wire 50 in the course of a washing cycle, the current flowing through said wire 50 causes a shrinking thereof, due to which the main slider 39 is translated, because of the tension exerted thereonto by the wire 50 through the terminal 52, towards the left for the observer of FIGS. 3 and 18. During this displacement the terminal 52 constantly slides on the appendix 31b of the electrically conductive member 31, and an electric current constantly flows through the wire 50, until when terminal 52 abandons the appendix 31b and slides onto the electrically insulating material 83, then stopping the supply of current to the wire 50 automatically, without the necessity of the intervention of any external devices.

Said translation of the slider 39 determines a corresponding rotation of the members 10 and 9, and the latter is then allowed to pass to the angular position in which it uncouples from the crank member 7 associated with the cover 6, and the latter may then pass to the position in which it opens the receptacle 5 for the detergent (FIG. 8). The detergent contained in the receptacle 5 is then dispensed, by gravity, toward the washing chamber.

As it will become apparent more clearly in the following, during the above-described translation of the main slider 39 the slider 40 remains instead in its rest position shown in FIGS. 15-23, under the effect of the force exerted thereonto by the contrast spring 45.

Between the sliders 39 and 40 there is provided a particular coupling arrangement, which is now described herebelow.

With reference to FIG. 14, in the upper surface of the slider 40, which faces the main slider 39, there is formed a shaped recess 60, having an essentially quadrangular shape. Said recess is delimited on the rear by a wall 60*a* which is partially cut, on the front by a wall 60*b*, and on the sides by two walls 60*c* and 60*d* which are essentially parallel with one another (FIG. 14).

The recess 60 is further delimited by a shaped bottom wall wherein, as it is described in the following, there is defined a predetermined operational path for a spherical transmission member 61 which is mounted movable in said recess.

Figure 16:
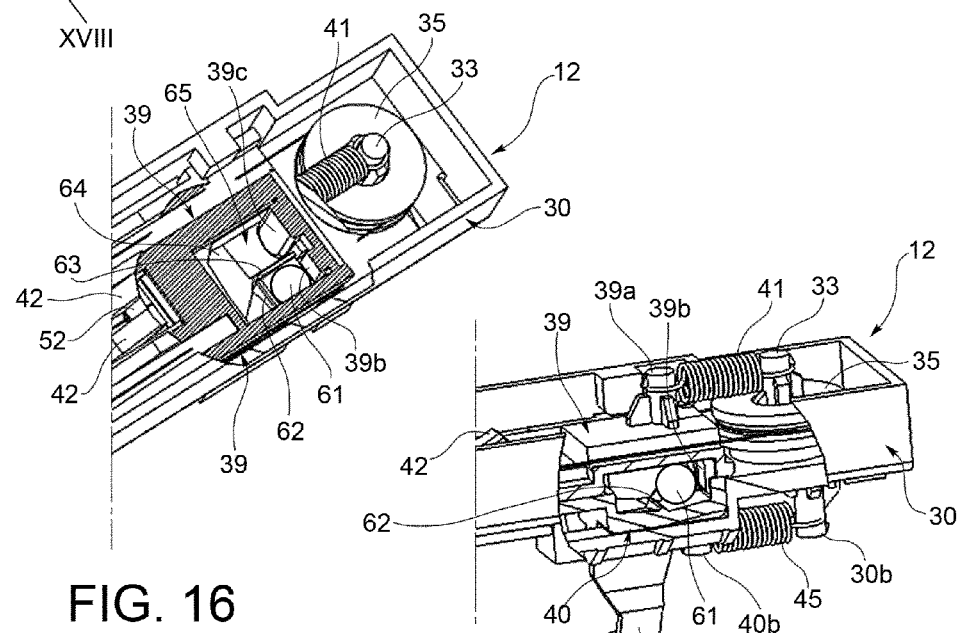
FIGS. 16 and 17 are partial perspective views showing a first condition of operation of the actuator device according to FIGS. 14 and 15.

As it can be seen in part in FIG. 14 and is better visible in FIGS. 15 and 16, in its rear portion the main slider 39 has two vertical appendixes 39*b* and 39*c*, flanking transversely one another and protruding downwardly within the recess 60 of the slider 40.

From the bottom wall of the recess 60 an intermediate longitudinal wall 63 having a reduced height extends essentially parallel to the side walls 60*c* and 60*d*. This wall 63 extends from the rear wall 60*a*, up to a distance from the wall 60*b* which is slightly greater than the diameter of the spherical member 61.

The bottom wall of the recess 60 also forms a transverse step-like protrusion 62, which extends between the walls 60*c* and 63.

Between the protrusion 62 and the side wall 60*b*, the bottom wall of the recess 60 forms a transverse ramp 64, which slightly lowers toward the side wall 60*d* of said recess (see in particular FIGS. 15 and 16).

Between the intermediate wall 63 and the side wall 60*d*, the bottom wall of the recess 60 is lowered and defines a sort of well indicated 65 in FIG. 16 as well as in FIGS. 24 and 26.

The well 65 is delimited between the ramp 64, the intermediate wall 63 and a portion of the side wall 60*d*, as well as the lower projection 39*c* of the main slider 39.

When the door of the dishwasher machine is closed in view of starting a new washing cycle, both sliders 39 and 40 are in their rest positions shown in FIGS. 15 to 17. In this condition the spherical transmission member 61 is disposed in a seat delimited between the intermediate wall 63, the lower projection 39*b* of the main slider 39, the side wall 60*c* of the recess 60 and the step protrusion 62 (FIGS. 15-17).

The first energisation of the shape-memory wire 50 causes the shrinking thereof and the displacement of the main slider 39 from its rest position (FIG. 15-17) to the working position (FIGS. 19 and 20). During that displacement, the lower projection 39*b* of the slider 90 moves the spherical member 61 beyond the step protrusion 62. The spherical member reaches thus the ramp 64. Said spherical member is however prevented from falling into the well 65, since the projection 39*c* of the slider 39 is now close to the rear edge of the ramp 64.

The above-described translation of the main slider 39 does not however cause any displacement of the slider 40, which is kept in its rest position by the contrast spring 45.

The first energisation of the shape-memory wire and the consequent translation of the slider 39 cause, as described above, the unhooking of the cover 6 associated with the receptacle 5 for the detergent, and the consequent dispensing of said detergent toward the washing chamber.

The shape-memory wire 50 is then de-energised by interruption of the voltage applied between terminals 31*a* and 32*a* of members 31 and 32: the wire 50 shrinks again and, under the action of the return spring 41, the main slider 39 returns towards its rest position. Thus, the lower projection 39*b* of the latter progressively opens the well 65, into which the spherical member 61 can fall, under gravity (FIGS. 21, 22, 24 and 25), when the slider 39 approaches or reaches its rest position.

The engagement of the spherical member 61 into the well 65 now renders the sliders 39 and 40 solid with one another.

Figure 5:
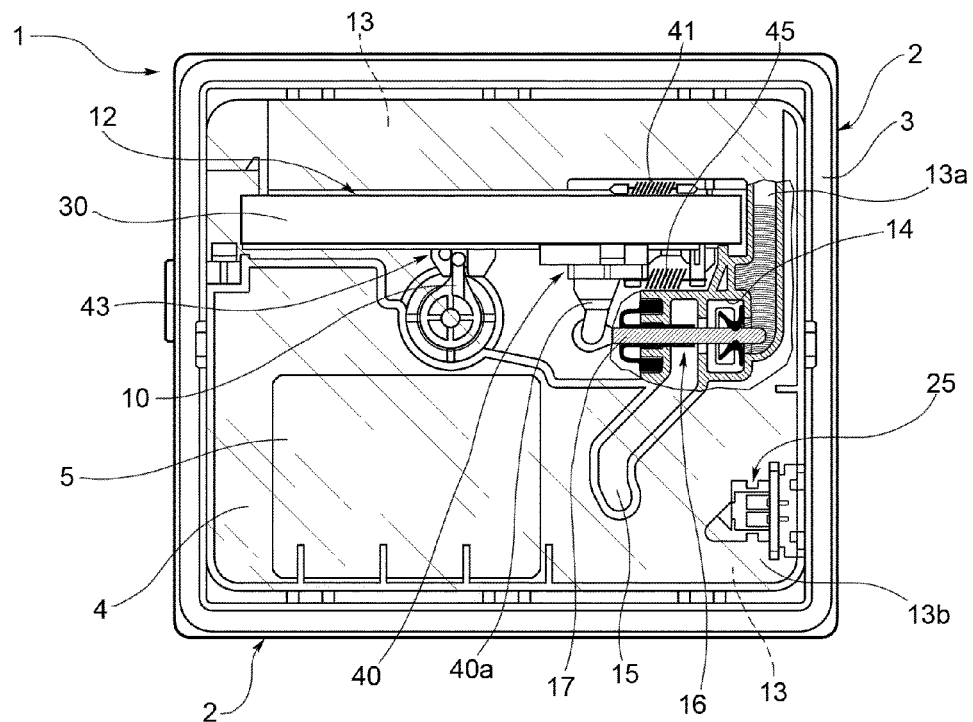
FIGS. 5 and 6 are similar to FIG. 3, and show two different conditions of operation of the integrated dispensing device according to the invention.
Figure 5A:
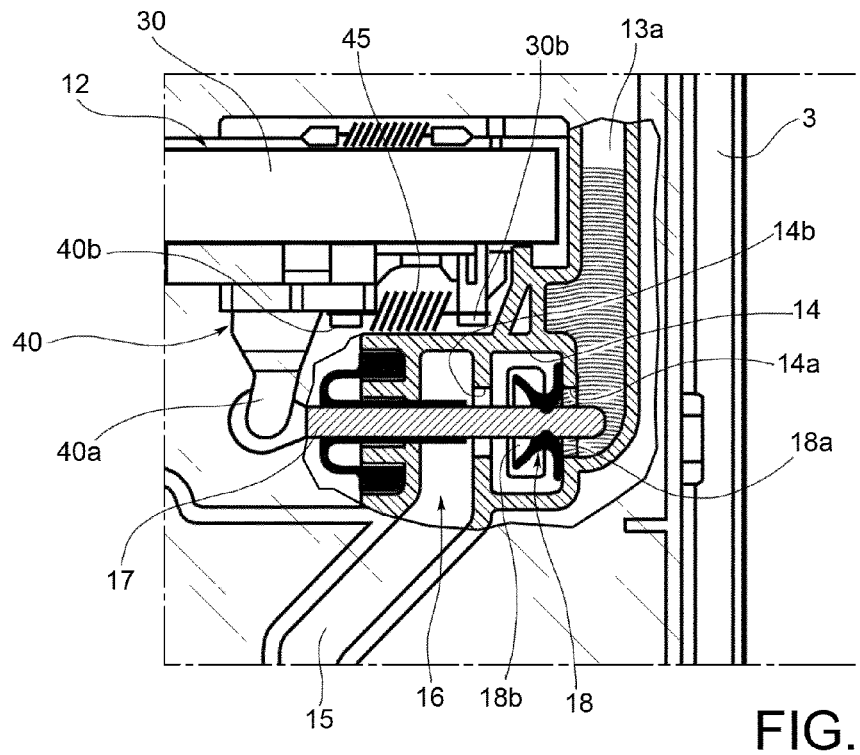
FIGS. 5A and 6A show enlarged details of FIGS. 5 and 6, respectively.
Figure 6A:
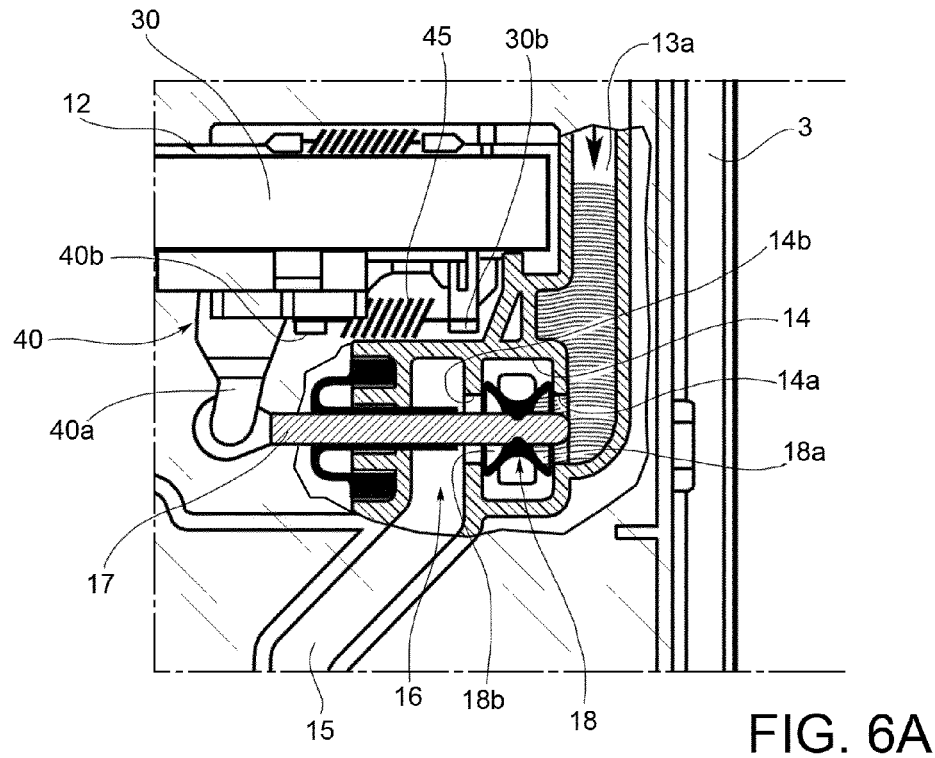
Figure 9A:
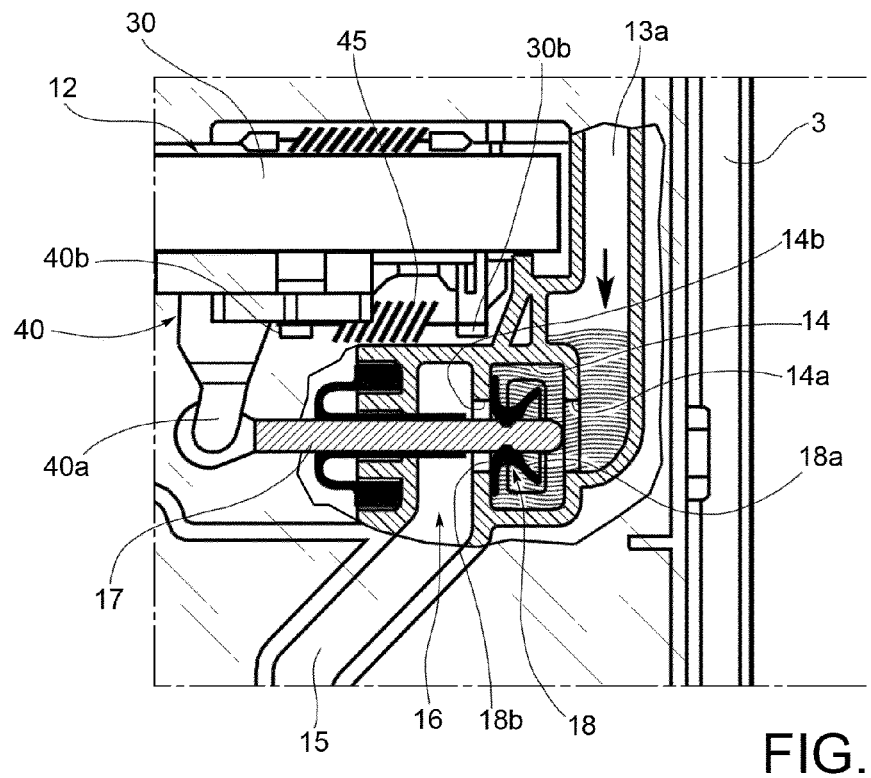
FIGS. 9A, 10A and 11A show enlarged details of FIGS. 9, 10 and 11, respectively.

At the subsequent energisation, the shrinking of the shape-memory wire 50 causes the joint translation of the sliders 39 and 40 towards their respective working positions (FIGS. 26 and 27): the translation of the slider 39 does no longer exert any effect onto the cover 6 of the detergent receptacle, which remains open, whereas the translation of the slider 40 through arm 40*a* thereof causes the displacement of the rod 17 and the associated double obturator 18 from the position of FIG. 5A to the position of FIG. 9A, passing through the intermediate position of FIG. 6A.

When the shape-memory wire 50 is subsequently de-energised, the sliders 39 and 40 jointly return toward their respective rest positions.

Figure 10A:
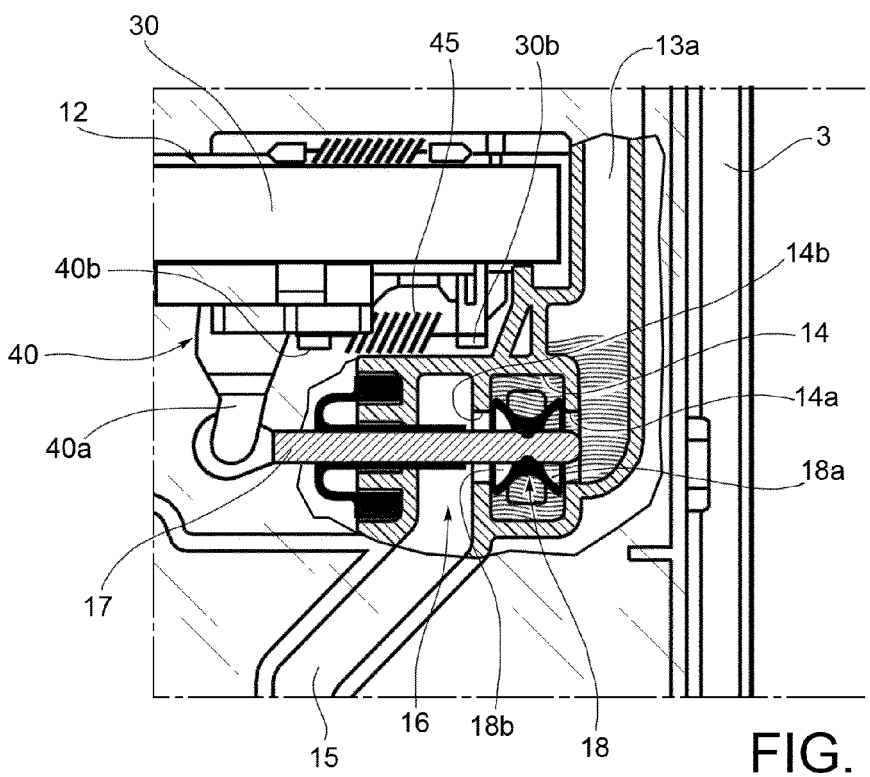
Figure 11A:
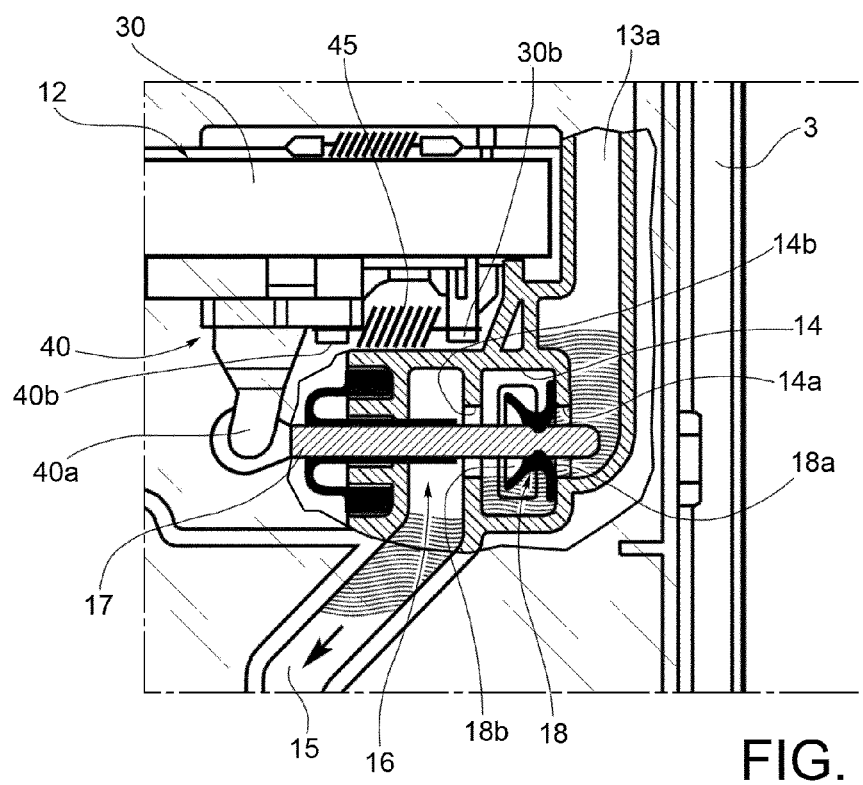

The translation of the slider 39 thus determines the re-arrangement of the hooking member 9 in the position in which it will be subsequently able to couple with the crank member 7 such as to retain the cover 6 of the receptacle 5 in the closed position. The translation of the slider 40 causes instead the displacement of the rod 17 and the obturator 18 toward the position of FIG. 11A, passing through the intermediate position of FIG. 10A, causing the dispensing of a dose of rinsing or brightening agent.

Possible further energisations and de-energisations of the shape-memory wire 50 in the course of the same washing cycle will produce the dispensing of corresponding new doses of rinsing or brightening agent.

Once the washing cycle is ended, the door of the dishwasher machine can be opened. The oscillation of the door and of the integrated dispensing device 1 is such that the spherical transmission member 61 returns by gravity to its initial position shown in FIGS. 15 to 17. The actuator device 12 is then again reset in its initial operational condition.

Figure 29:
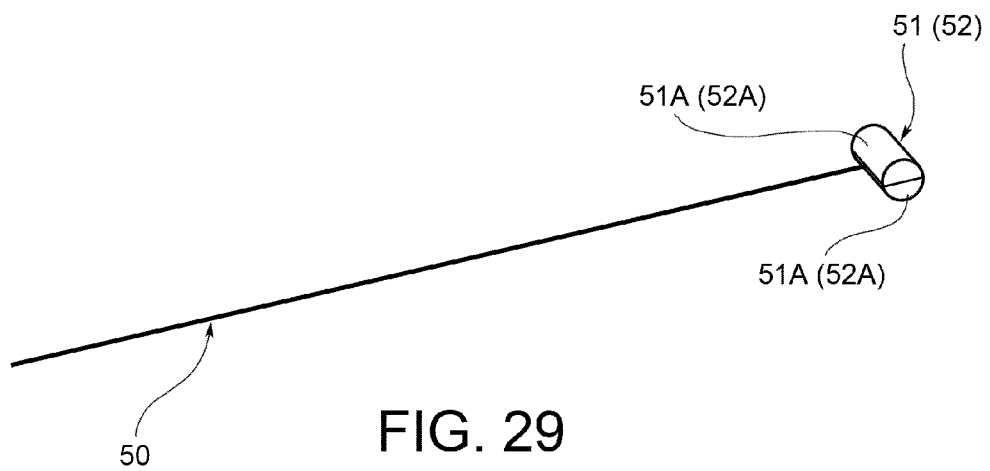
FIGS. 28 and 29 are partial perspective views showing a portion of the shape-memory wire utilised in the actuator device according to FIGS. 14 to 27.
Figure 28:
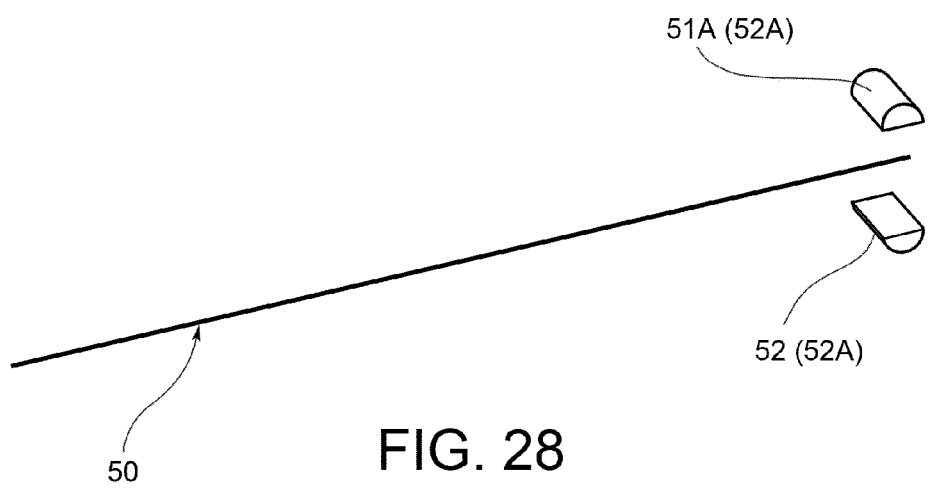

The terminals 51 and 52 of the shape-memory wire 50 can be conveniently assembled with two half-cylinders 51A (52A) of an electrically conducting material, electrically welded or soldered to one another with the interposition of a respective end of said wire 50, as it is shown in FIGS. 28 and 29.

The integrated dispensing device according to the present invention has a number of advantages.

Firstly, it allows to achieve the opening of the cover of the receptacle for the washing agent or detergent, and the dispensing of one or more doses of the rinsing agent, in a manner completely independent one from the other. It is particularly prevented that a dose of rinsing agent is dispensed when the cover of the washing agent receptacle is opened.

The provision of a dosing chamber allows to precisely determine the amount of a rinsing agent supplied to the washing chamber at each dispensing.

The provision of the auxiliary chamber(s) in the main chamber of the dispenser for the rinsing agent allows, as it has been described above, to reduce the frequency of re-filling said dispenser.

The terminals of the shape-memory wire, made of half-cylinders welded or soldered to the ends of the wire 50, perform at the same time the function of mechanical anchoring members and electric contacts for supplying an electric current to said wire. In particular, the terminal 52 indicated above operates as a sliding contact during the displacements of the main slider 39.

Figure 30:
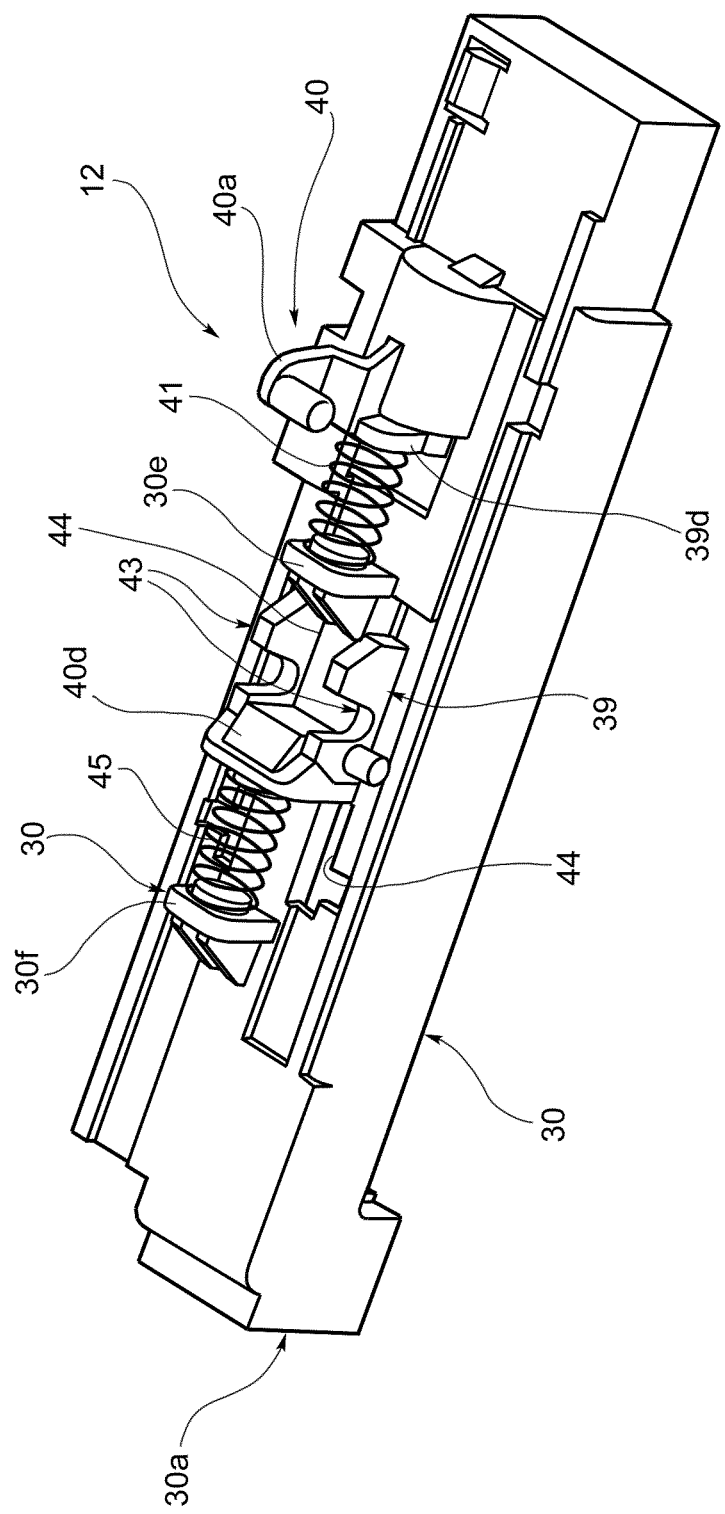
FIG. 30 is a partial perspective view showing a variant of embodiment of the actuator device according to FIGS. 14 to 29.

In FIG. 30 of the enclosed drawings there is shown a variant of embodiment. That variant differs from the embodiment previously described mainly in the different arrangement of the contrast springs, once again indicated 41 and 45, respectively. In particular, both said springs are arranged below the bottom wall of the housing 30 of the actuator device 12: the spring 41 being interposed between a lower appendix 39*d* of the slider 39 and a contrast projection 30*e* protruding from the bottom wall of the support housing 30, the spring 45 being interposed between and appendix 40*d* of the slider 40 and contrast projection 30*f* of the housing 30.

However, other alternative arrangements of the contrast springs are possible.

Naturally, the principle of the invention remaining the same, the forms of embodiment and the design details may be widely varied with respect to what has been described and illustrated merely as a non-limiting example, without departing from the scope of the invention, as defined in the annexed claims.

The invention claimed is:

1. An integrated dispensing device for a rotatable door of a washing machine, comprising:
   a support body wherein there are provided first and second dispensers, adjacent one another, for a washing agent and a rinsing agent, respectively; and
   an electrically-controlled actuator device, coupled to the first dispenser such that when the door is closed a first energization of the actuator device causes the dispensing of the washing agent, and coupled to the second dispenser through a transmission mechanism predisposed to become enabled to operate after a first energization of the actuator device after the door is closed, to allow the dispensing of the rinsing agent as a consequence of at least one subsequent energization of the actuator device;
   the second dispenser comprises:
     a main chamber adapted to contain a plurality of doses of rinsing agent,
     a dosing chamber having a predetermined volume, corresponding to that of a dose, and having an inlet opening and an outlet opening to be fluidically connected with the main chamber and with a discharge conduit, respectively, and
     a valve device including an obturator mounted movable in the dosing chamber and controlled by said actuator device such that
   when the actuator device is energized, after the transmission mechanism has been enabled for operation, the obturator passes from a rest position in which the obturator closes the inlet opening of the dosing chamber and fluidically disconnects the dosing chamber from the main chamber, to a loading position, in which the obturator opens the inlet opening and keeping constantly closed the outlet opening of the dosing chamber, to allow a flow of rinsing agent from the main chamber to the dosing chamber through said inlet opening; and
   when the actuator device is subsequently de-energized, the obturator returns from the loading position to the rest position, opening the outlet opening and still closing the inlet opening of the dosing chamber;
   wherein during the entire displacement of said obturator between the rest position and the loading position, the main chamber fluidically disconnected from the discharge conduit.

2. The integrated dispensing device according to claim 1, wherein said obturator comprises a rod carrying a seal having two flexible annular sealing lips, axially spaced from one another and cooperating with the inlet and the outlet of the dosing chamber, respectively.

3. The integrated dispensing device according to claim 1, wherein one portion of the main chamber of the second dispenser has an associated detecting device adapted to provide electric signals indicative of the level of the rinsing agent when the door is open, and wherein in said main chamber there is formed at least one auxiliary chamber adapted to receive an amount of rinsing agent when while the door is open the main chamber is supplied with an amount of said rinsing agent greater than a predetermined value; said at least one auxiliary chamber being configured to pour into the main chamber part of the rinsing agent contained therein when, while the door is closed, the level of said agent in the main chamber falls below a predetermined level, such that when the door is subsequently opened again, the level of the rinsing agent in the main chamber at said detecting device is increased due to the amount of rinsing agent poured from said at least one auxiliary chamber.

4. The integrated dispensing device according to claim 1, wherein the actuator device comprises:
   a stationary structure,
   a main slider, coupled with the first dispenser and movable relative to said structure along a predetermined direction between a rest position and a working position, and
   a wire of a shape-memory material, having its ends connected to said structure and said slider, respectively, and coupled with said slider such that when the wire is energized by means of an electric current, the wire shrinks and causes a displacement of said slider from the rest position toward the working position, against the action of resilient contrast means, and when de-energized the wire re-elongates allowing a displacement of said slider toward the rest position.

5. The integrated dispensing device according to claim 4, wherein the stationary structure of the actuator device carries first and second electrically conducting members for applying a voltage to the ends of the shape-memory wire; the end of said wire which is connected to the slider being mounted slidable in contact with an extension of one of said electrically conducting members.

6. The integrated dispensing device according to claim 5, wherein said end of the wire is arranged to slide onto a formation made of an electrically insulating material, leaving the extension of said first electrically conducting member, when the shrinking of the wire exceeds a predetermined value, thus automatically stopping the flow of electric current in said wire.

7. The integrated dispensing device according to claim 4, wherein said transmission mechanism comprises a further slider connected with the obturator of the second dispenser and translatable with respect to the stationary structure along said predetermined direction, from a rest position toward a working position, against the action of associated resilient contrast means, said further slider being coupled with the main slider through a spherical member interposed therebetween, such that when the door of the machine is closed, the spherical member is arranged and is retained in a position in which the further slider is uncoupled from the main slider;

when the shape-memory wire is energized for the first time in an washing cycle, the main slider translates toward its working position, for activating the first dispenser, and moves the spherical member to a second position in which the auxiliary slider is still uncoupled from the main slider;

when said wire is thereafter de-energized, the main slider translates toward its rest position, and the spherical member is displaced by gravity toward a third position in which it engages in a seat defined between said sliders, making said sliders solid with one another for translation; and when said wire is energized again, the main slider translates again toward its working position dragging the auxiliary slider toward its own working position for activating the second dispenser;

the spherical member remaining in said seat until the next opening of the door of the machine.

8. A washing machine, comprising the integrated dispensing device according to claim 1.

* * * * *